(12) United States Patent
Kuppusamy et al.

(10) Patent No.: US 10,104,630 B2
(45) Date of Patent: Oct. 16, 2018

(54) METHODS AND DEVICES FOR TIME AND FREQUENCY OFFSET ESTIMATION

(71) Applicant: Intel IP Corporation, Santa Clara, CA (US)

(72) Inventors: Vijaykumar Kuppusamy, Bangalore (IN); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 208 days.

(21) Appl. No.: 15/205,023

(22) Filed: Jul. 8, 2016

(65) Prior Publication Data

US 2018/0014268 A1    Jan. 11, 2018

(51) Int. Cl.

| | |
|---|---|
| *H04W 4/00* | (2018.01) |
| *H04W 56/00* | (2009.01) |
| *H04L 25/02* | (2006.01) |
| *H04B 1/40* | (2015.01) |

(52) U.S. Cl.
CPC ........... *H04W 56/0035* (2013.01); *H04B 1/40* (2013.01); *H04L 25/0202* (2013.01)

(58) Field of Classification Search
None
See application file for complete search history.

(56) References Cited

U.S. PATENT DOCUMENTS

2006/0104257 A1* 5/2006 Laroia ................. H04L 27/2659
    370/350
2009/0213943 A1* 8/2009 Gu ...................... H04L 25/0204
    375/260

(Continued)

FOREIGN PATENT DOCUMENTS

| WO | 2015154801 A1 | 10/2015 |
|---|---|---|
| WO | 2017067601 A1 | 4/2017 |

OTHER PUBLICATIONS

3rd Generation Partnership Project; Technical Specification Group Radio Access Network; Evolved Universal Terrestrial Radio Access (E-UTRA); Physical channels and modulation (Release 13), 3GPP TS 36.211, V13.1.0 (Mar. 2016), [especially Section 6.10.1, p. 104-107].

(Continued)

*Primary Examiner* — Alex Skripnikov
*Assistant Examiner* — Lionel Preval
(74) *Attorney, Agent, or Firm* — Viering, Jentschura & Partner mbB

(57) ABSTRACT

A circuit arrangement includes a channel estimation circuit configured to acquire a channel estimate including a plurality of channel samples based on a range of time and frequency locations of a received signal, a first calculation circuit configured to calculate a first time and frequency correlation product of the channel estimate and a second calculation circuit configured to calculate a second time and frequency correlation product of the channel estimate, a time offset circuit configured to determine a time offset based on the first time and frequency correlation product and the second time and frequency correlation product, and a frequency offset circuit configured to determine a frequency offset based on the first time and frequency correlation product and the second time and frequency correlation product.

19 Claims, 14 Drawing Sheets

(56) References Cited

U.S. PATENT DOCUMENTS

2013/0121246 A1* 5/2013 Guey ................. H04W 56/001
　　　　　　　　　　　　　　　　　　　370/328
2017/0223648 A1* 8/2017 Shin ................... G06F 13/4273

OTHER PUBLICATIONS

The extended European search report based on Application No. 17177265.0 (9 Pages) dated Dec. 1, 2017 (Reference Purpose Only).

* cited by examiner

CRS position
Interpolated CRS position

METHODS AND DEVICES FOR TIME AND FREQUENCY OFFSET ESTIMATION

TECHNICAL FIELD

Various embodiments relate generally to methods and devices for time and frequency offset estimation.

BACKGROUND

Conventional wireless communication technologies rely on a high degree of time and frequency synchronization in order to support radio communications between devices. Many such wireless technologies rely on the broadcast of reference signals in order to provide a time and frequency reference to mobile terminals for use in establishing and maintaining synchronization with transmitters. In particular, Long Term Evolution (LTE) cells may broadcast Primary Synchronization Signals (PSSs) and Secondary Synchronization Signals (SSSs) to facilitate initial establishment of time and frequency synchronization in addition to cell-specific reference signals (CRSs) for time and frequency synchronization tracking. Accordingly, LTE mobile terminals may receive and process such reference signals in order to continuously maintain synchronization with both the timing and carrier frequency of LTE cells.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
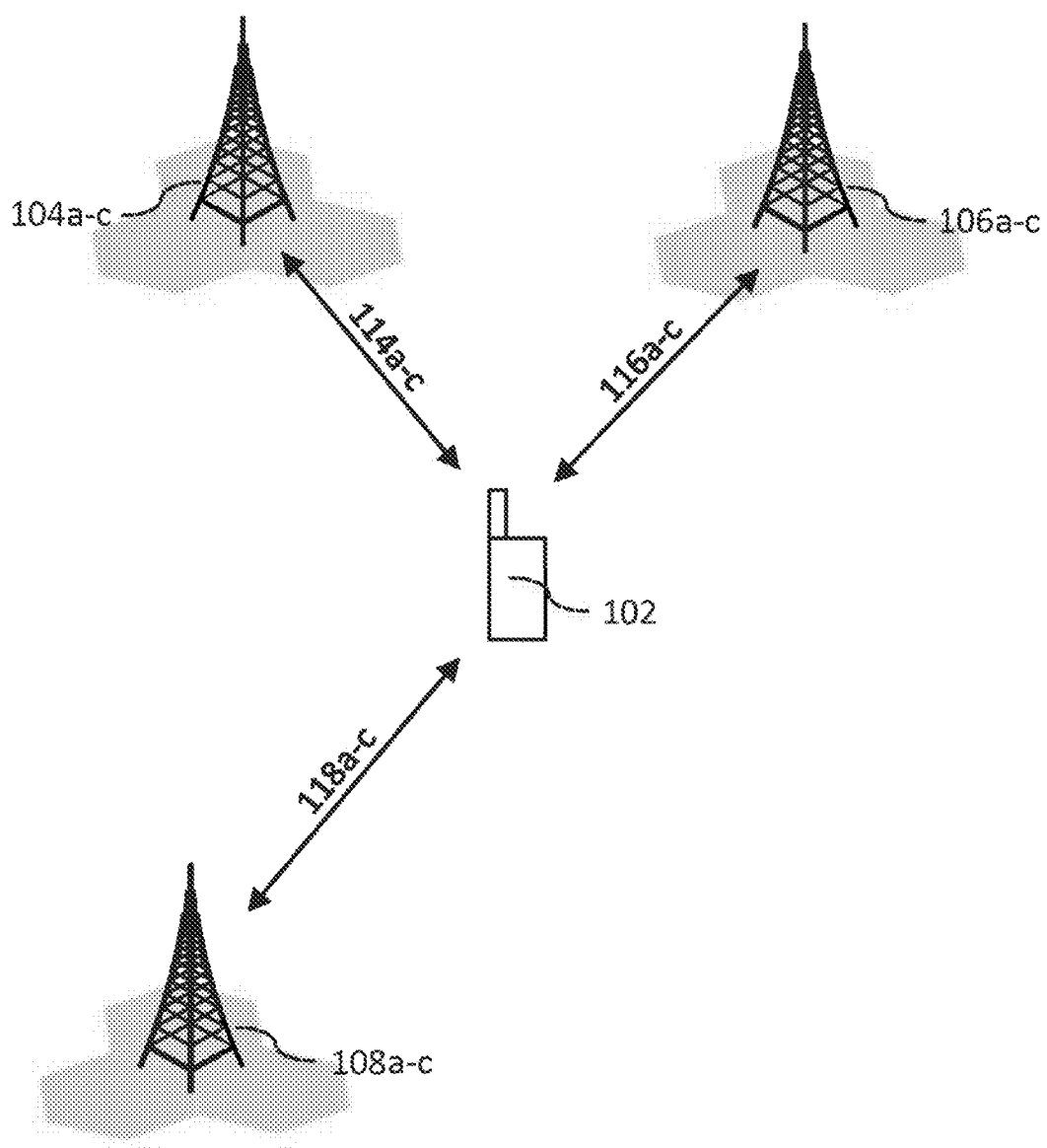
FIG. 1 shows a radio communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception.

The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

Mobile terminals in Long Term Evolution (LTE) networks may utilize reference signals such as Primary Synchronization Signals (PSSs), Secondary Synchronization Signals (SSSs), and cell-specific reference signals (CRSs) in order to establish and maintain both time and frequency synchronization with LTE cells. LTE cells may thus broadcast such reference signals for reception by nearby mobile terminals, which may then apply the received reference signals for time tracking and carrier frequency adjustment.

FIG. 1 shows a diagram of radio communication network 100, which may be an LTE network containing mobile terminal 102 and base stations 104, 106, and 108 and mobile terminal 102. Each of base stations 104-108 may be an LTE base station (eNodeB) and may be sectorized, i.e. composed of multiple LTE cells. As denoted in FIG. 1, each of base stations 104-108 may be composed of e.g. three cells, i.e. cells 104a-104c for base station 104, cells 106a-106c for base station 106, and cells 108a-108c for base station 108. The unique radio channels between each of cells 104a-104c, 106a-106c, and 108a-108c and mobile terminal 102 may be respectively denoted as radio channels 114a-114c, 116a-116c, and 118a-118c.

Depending on the operational status of mobile terminal 102, mobile terminal 102 may exchange uplink and/or downlink data with one or more of cells 104a-108c. For example, mobile terminal 102 may be connected with cell 104a of base station 104 (in a radio connected state) and may thus transmit and receive data with cell 104a over radio channel 114a. One or both of mobile terminal 102 and cell 104a may additionally be configured according to a Multiple Input Multiple Output (MIMO) transmission scheme, in which case radio channel, in which case radio channel 114a may be further divided into a plurality of MIMO channels that each correspond to the unique path between a given transmit antenna (corresponding to a transmit antenna port) of cell 104a and a given receive antenna (corresponding to a receive antenna port) of mobile terminal 102.

In order to support radio communications between mobile terminal 102 and cell 104a, mobile terminal 102 may need to maintain tight synchronization with cell 104a in both time and frequency. For example, in terms of time synchronization mobile terminal 102 may need to remain aligned with the data symbol boundaries in the timing schedule used by cell 104a. In terms of frequency synchronization, mobile terminal 102 may need to tune the receiver of mobile terminal 102 to the correct carrier frequency that matches the transmitter of cell 104a in order to effectively downlink receive radio signals from cell 104a (and vice versa in the uplink direction.

Timing and carrier frequency misalignment between mobile terminal 102 and cell 104a may result in time and frequency offsets that can degrade the quality of communications between mobile terminal 102 and cell 104a. Accordingly, mobile terminal 102 may need to be able to accurately identify timing and carrier frequency offsets in order to successfully maintain time and frequency synchronization. Conventional synchronization techniques may perform time and frequency offset estimation separately, i.e. a first process to identify the time offset (if any) and a second process to identify the frequency offset (if any). Such techniques may be referred to as single-dimensional or "1D" as the estimation is done in two separate processes that each operating in only a single direction.

These time and frequency offset estimation techniques may be derived via a system model of transmitted LTE signals. It is noted that while the following description may focus on an LTE context, the implementations detailed this disclosure may be analogously applied to any radio communication technology with reference symbols, in particular for reference symbols that are placed according to a specific pattern or evenly-spaced grid.

In the context of LTE s specified by the $3^{rd}$ Generation Partnership Project (3GPP), LTE cells may perform downlink transmissions according to 10 ms radio frames that are each divided into 10 subframes of 1 ms duration each, i.e. 10 Transmission Time Intervals (TTI). Each subframe may be further divided into two slots (each of 0.5 ms duration) of either 6 or 7 symbol periods each (depending on the Cyclic Prefix (CP) length), where each symbol period may contain one Orthogonal Frequency Division Multiplexing (OFDM) symbol.

The LTE system bandwidth may be split into a plurality of evenly-spaced subcarriers, which as noted above may each carry a single OFDM symbol during each symbol period. As defined by the 3GPP, the subcarriers may be uniformly positioned on a 15 kHz grid and include a central DC subcarrier; accordingly, the number of subcarriers may vary between 73 and 1201 according to the variable 1.4 to 20 MHz system bandwidth. Each symbol period may be defined as a Resource Element (RE), and accordingly each RE (per antenna port) may hold a single OFDM symbol. REs may be further grouped into Resource Blocks (RB), which is a time-frequency block spanning one slot (6 or 7 symbols) and 12 subcarriers (180 kHz), e.g. a block of 84 REs for normal CP.

Figure 2:
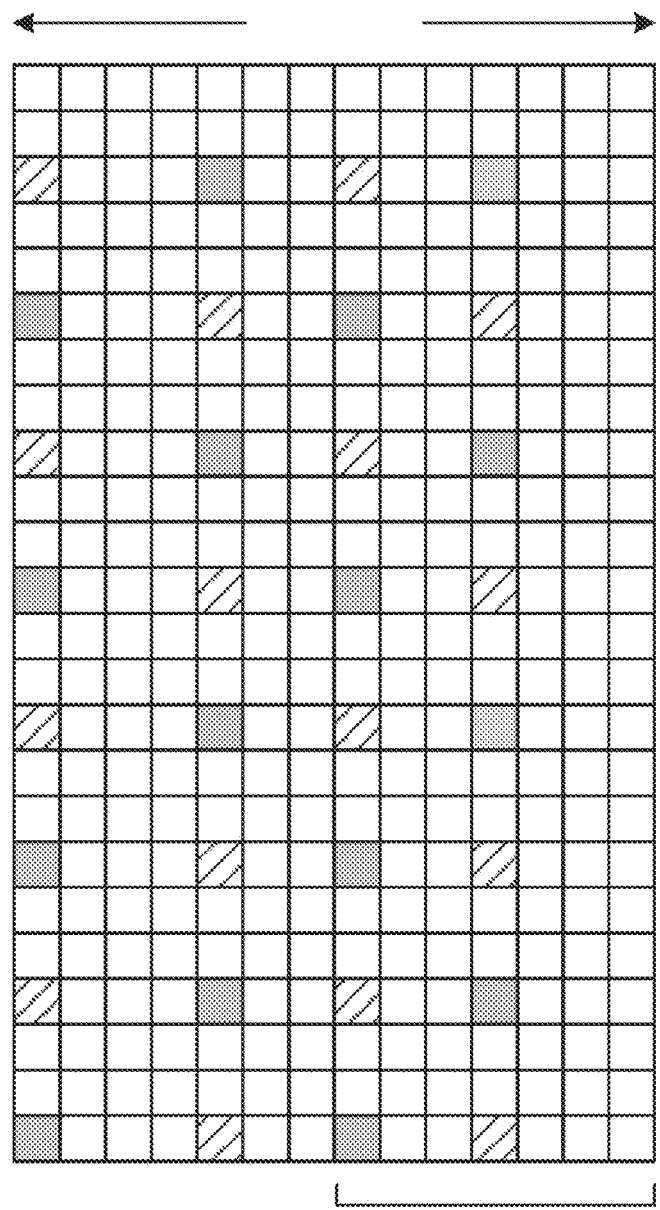
FIG. 2 shows a resource grid containing reference symbols.
Figure 6:
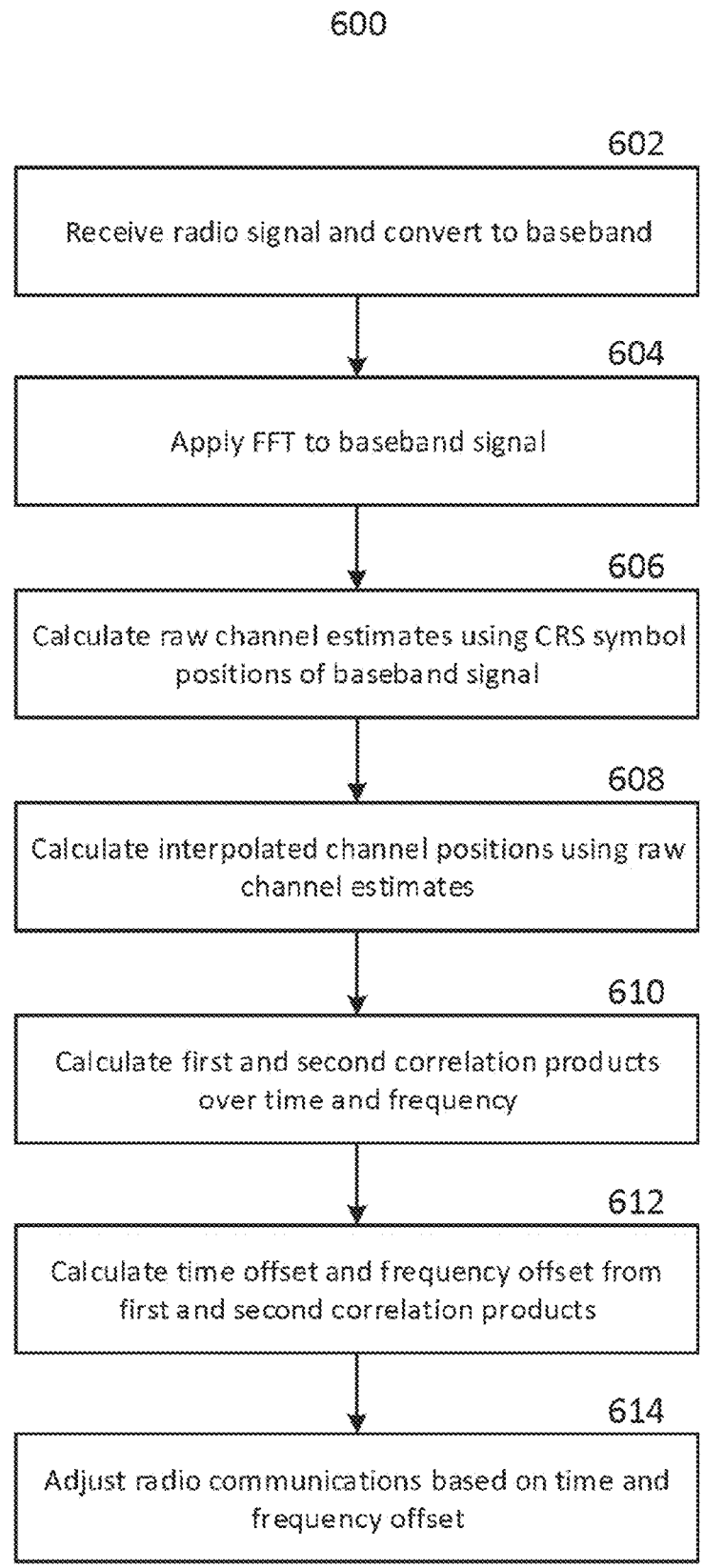
FIG. 6 shows a method of offset estimation.

FIG. 2 shows an exemplary downlink LTE resource grid 200 depicting 24 subcarriers across a single 1 ms subframe, i.e. two slots. Each RE may thus contain a single modulated symbol, where each modulated symbol may be a complex symbol of the form a +jb (i.e. an In-phase/Quadrature or IQ symbol) that represents 2, 4, or 6 bits (depending on the selected adaptive modulation scheme). As shown in FIG. 2, each LTE cell may transmit cell-specific reference signals (CRS) according to a specific pattern, where the gray-shaded REs of resource gird 200 depict an exemplary CRS RE mapping pattern for an exemplary single-antenna port case with normal CP duration (the pattern-filled 'interpolated' CRS positions will be further detailed below). As detailed in Section 6.10.1 of "Physical channels and modulation (Release 13)", 3GPP TS 36.211 V13.1.0 ("3GPP TS 36.211), the specific pattern utilized by each cell may depend on the Physical Cell Identity (PCI) and number of transmit antenna ports utilized by each cell. FIG. 6.10.1.2-1 of 3GPP TS 36.211 depicts an exemplary mapping of downlink reference signals for a cell of a given PCI with varying numbers of antenna ports (1, 2, and 4). As shown in FIG. 2 and FIG. 6.10.1.2-1 of 3GPP 36.211, each antenna port may transmit four CRS symbols per RB, where the CRS REs are spaced every 6 subcarriers in frequency. As can be seen in FIG. 6.10.1.2-1, LTE cells having multiple antenna ports may transmit the CRS symbols on each port with different REs; accordingly, the 'combined' resource grid from all transmit antenna ports may contain non-overlapping CRS symbols positioned at various different REs according to the particular CRS RE mapping.

Accordingly, mobile terminal 102 may determine the CRS mapping of a given LTE cell, e.g. cell 104a, based on the PCI and number of antenna ports of cell 104a (which mobile terminal 102 may determine during initial synchronization) and may subsequently identify the REs that contain CRS symbols within the system bandwidth. As the transmitted CRS symbols are predefined according to the sequence generation and mapping schemes of Sections 6.10.1 of 3GPP TS 36.211, mobile terminal 102 may compare the received CRS symbols to predefined local CRS symbol copies in order to evaluate whether there is any time and/or frequency offset between mobile terminal 102 and the cell 104a (by obtaining and evaluating raw channel samples at the CRS positions via the comparison, as further detailed below). As detailed below, mobile terminal 102 may identify time and frequency offsets by correlating the received CRS symbols over time and frequency. Upon identifying a time or frequency offset, mobile terminal 102 may then perform timing or carrier frequency tuning adjustments in order to synchronize reception with the cell 104a; accordingly, mobile terminal 102 may continuously maintain, or 'track', synchronization with cell 104a over time.

The LTE system model for the downlink path between mobile terminal 102 and a given LTE cell, e.g. cell 104a, may thus be derived as follows. Given a time-domain OFDM signal $s_l^p(n)$ transmitted on antenna port p of cell 104a during the l-th OFDM symbol period of a given subframe, the time-domain signal $r_l^q(n)$ received by mobile terminal 102 at the q-th receive antenna port may be expressed as $$r_l^q(n) = e^{\frac{j2\pi\varepsilon n}{N}} \sum_{p=0}^{P-1} \left\{ \sum_{i=0}^{L-1} \{h_{i,l}^{p,q} s_l^p(n - \tau_i)\} \right\} + z_l^q(n) \quad (1)$$

where P is the number of antenna ports, n is the time sample index within the subframe, $h_{i,l}^{p,q}$ is the channel impulse response between the p-th transmit antenna port of cell 104a and the q-th receive antenna port of mobile terminal 102, $z_l^q(n)$ gives the additive Gaussian noise at the q-th receive antenna port, and $\varepsilon$ gives is the normalized carrier frequency offset (over subcarrier spacing) between the transmitter of cell 104a and the receiver of mobile terminal 102. In other words, the time-domain signal received at each receive antenna port q of mobile terminal 102 for each transmit antenna port p of cell 104a is the convolution between the time-domain transmitted signal $s_l^p(n-\tau_i)$ and the channel impulse response $h_{i,l}^{p,q}$ (according to the finite impulse response property) offset in phase proportional to the normalized carrier frequency offset $\varepsilon$ plus the additive noise $z_l^q(n)$.

As previously noted, REs may contain a transmit symbol, where $s_l^p(n)$ is the time-domain OFDM signal following application of an inverse Fast Fourier Transform (FFT) to the transmit symbols of each subcarrier by the OFDM transmitter of cell 104a. $s_l^p(n)$ may be expressed in terms of the original frequency-domain symbols $S_l^p(k)$ as $$s_l^p(n) = \frac{1}{N} \sum_{k=-\frac{K}{2}}^{\frac{K}{2}} S_l^p(k) e^{\frac{j2\pi k(n-l(N+N_{cp})-N_{cp})}{N}} \quad (2)$$

where $S_l^p(k)$ is the symbol transmitted by the p-th antenna port cell 104a on the k-th OFDM subcarrier, N denotes the FFT size and $N_{CP}$ is the Cyclic Prefix (CP) length. Accordingly, each time-domain transmit OFDM signal $s_l^p(n)$ may be the Fourier transform of the frequency-domain symbols $S_l^p(k)$ placed at each of the corresponding subcarriers with the added cyclic prefix.

As previously indicated, the normalized carrier frequency offset $\epsilon$ of $r_l^q(n)$ may arise from a carrier frequency mismatch between the transmitter of cell 104a and the receiver of mobile terminal 102. There may additionally exist a time uncertainty $n_0$ (i.e. time offset) in which the symbol boundary alignment of the receiver of mobile terminal 102 does not match the transmitter of cell 104a. Given time uncertainty $n_0$, the time index n for each l-th OFDM symbol of a subframe may range between $l(N+N_{cp})+N_{cp}+n_0 \leq n \leq l(N+N_{cp})+N_{cp}+n_0+N-1$, i.e. between the actual start of the l-th OFDM symbol (following the cyclic prefix for the l-th OFDM symbol, i.e. at $l(N+N_{cp})+N_{cp}$) and the actual end of the l-th OFDM symbol (at $l(N+N_{cp})+N_{cp}+N-1$) adjusted for the timing uncertainty $n_0$.

As each symbol period has N samples (not including the cyclic prefix), the timing index range may be expressed over 0 to N−1 by setting $n'=n-l(N+N_{cp})-N_{cp}-n_0$, i.e. $0 \leq n' \leq N-1$. Using n' and substituting for $s_l^p(n)$, Equation (1) may be rewritten as $$r_l^q(n') = e^{\frac{j2\pi\epsilon(n+l(N+N_{cp})+N_{cp}+n_0)}{N}} \qquad (3)$$

$$\sum_{p=0}^{P-1}\left\{\sum_{i=0}^{L-1} h_{i,l}^{p,q} \frac{1}{N}\sum_{k=-\frac{K}{2}}^{\frac{K}{2}} S_l^p(k) e^{\frac{j2\pi k(n'+n_0-\tau_i)}{N}}\right\} + z_l^q(n')$$

In accordance with an OFDM receiver, mobile terminal 102 may apply a length-N forward FFT to the signal $r_l^q(n')$ received from cell 104a during each symbol period l in order to convert the received time-domain signal $r_l^q(n')$ to the frequency domain, thus allowing mobile terminal 102 to recover the original frequency-domain symbols $S_l^p(k)$ transmitted on each subcarrier during each symbol period l by each transmit antenna port p of cell 104a. After applying the FFT, for each m-th subcarrier of mobile terminal 102 may obtain $$R_l^q(m) = \qquad (4)$$

$$\sum_{p=0}^{P-1} \frac{1}{N}\frac{\sin(\pi\epsilon)}{\sin\left(\frac{\pi\epsilon}{N}\right)} e^{\frac{j2\pi\epsilon}{N}\{l(N+N_{cp})+N_{cp}+n_0+\frac{(N-1)}{2}\}} e^{\frac{j2\pi m n_0}{N}} S_l^p(m)H_l^{p,q}(m) +$$

$$I_{l,ICI}^{p,q}(m) + Z_l^q(m)$$

At CRS reference symbol positions, only one antenna port's reference symbols are present (as other antenna port CRS are muted); accordingly, the above equation can be written at CRS symbol positions as $$R_l^{p,q}(m) = \qquad (5)$$

$$\frac{1}{N}\frac{\sin(\pi\epsilon)}{\sin\left(\frac{\pi\epsilon}{N}\right)} e^{\frac{j2\pi\epsilon}{N}\{l(N+N_{cp})+N_{cp}+n_0+\frac{(N-1)}{2}\}} e^{\frac{j2\pi m n_0}{N}} S_l^p(m)H_l^{p,q}(m) +$$

$$\sum_{p=0}^{P-1} I_{l,ICI}^{p,q}(m) + Z_l^q(m)$$

where $R_l^{p,q}(m)$ is the frequency-domain symbol transmitted by the p-th antenna port of cell 104a that received on the m-th subcarrier at the q-th antenna port of mobile terminal 102, $S_l^p(m)$ is the original frequency-domain OFDM symbol transmitted by the p-th antenna port of cell 104a, $H_l^{p,q}(m)$ is the channel frequency response between the p-th transmit antenna port of cell 104a and the q-th receive antenna port of mobile terminal 102, $Z_l^q(m)$ is the frequency-domain additive Gaussian at the q-th receive antenna port of mobile terminal 102, and $I_{l,ICI}^{p,q}(m)$ is the inter-carrier interference term for the channel between the p-th transmit antenna port of cell 104a and the q-th receive antenna port of mobile terminal 102 given as $$I_{l,ICI}^{p,q}(m) = e^{\frac{j2\pi\epsilon}{N}\{l(N+N_{cp})+N_{cp}+n_0+\frac{(N-1)}{2}\}} e^{\frac{-j\pi m(N-1)}{N}} \cdot \qquad (6)$$

$$\sum_{k \neq m}\left\{S_l^p(m)H_l^{p,q}(m)e^{\frac{j2\pi k(n_0+\frac{N-1}{2})}{N}}\frac{1}{N}\frac{\sin(\pi(\epsilon+k-m))}{\sin\left(\frac{\pi(\epsilon+k-m)}{N}\right)}\right\}$$

As can be seen in Equation (5), the received symbol $R_l^{p,q}(m)$ may include two complex exponential terms that depend on the normalized frequency offset $\epsilon$ and the time uncertainty $n_0$. Accordingly, if mobile terminal 102 is perfectly synchronized in both time and frequency with cell 104a, both $\epsilon$ and $n_0$ will equal zero and both complex exponential terms will resolve to 1; consequently, reception by mobile terminal 102 will not be affected by time or frequency mismatches. However, if a carrier frequency mismatch exists between the transmitter of cell 104a and the receiver of mobile terminal 102, the complex exponential depending on $\epsilon$ will produce a phase term that varies over time in l, i.e. that changes with each l-th OFDM symbol proportional to the normalized frequency offset $\epsilon$. Similarly, if a time offset exists between the transmitter of cell 104a and the receiver of mobile terminal 102, the complex exponential depending on $n_0$ will produce a phase term that varies over frequency in m, i.e. that changes over each m-th subcarrier proportional to the time uncertainty $n_0$.

In order to correct any time and/or frequency offsets via receiver adjustment, mobile terminal 102 may first need to accurately identify the offsets $n_0$ and/or $\epsilon$. As previously noted, as the CRS sequence generation is predefined mobile terminals may have a priori knowledge of the CRS symbols. Accordingly, given a received symbol $R_l^{p,q}(m)$ that is obtained from an RE containing a CRS symbol $S_l^p(m)$ (i.e. where the RE positioned at (m, l) is a CRS symbol position for the p-th antenna port), mobile terminal 102 may utilize a local copy of $S_l^p(m)$ to compare with $R_l^{p,q}(m)$ in order to evaluate the time and/or frequency offset (by obtaining a raw channel sample at the CRS position, as will be detailed below). As previously noted, the complex exponential term depending on the normalized frequency offset $\epsilon$ produces a phase term that varies over time in l while the complex exponential term depending on the time uncertainty $n_0$ produces a phase term that varies over frequency in m. Accordingly, mobile terminal 102 may utilize local CRS symbol copies in order to evaluate how the received CRS symbols $R_l^{p,q}(m)$ vary over time and frequency in order to respectively identify the frequency offset $\epsilon$ and time uncertainty $n_0$.

As noted above, such time and frequency offset estimation may conventionally be performed separately, i.e. with single-dimensional estimation techniques where the variation of received CRS symbols are evaluated over time to identify the carrier frequency offset $\epsilon$ separately from evaluating the variation of the received CRS symbols over frequency to identify the time uncertainty $n_0$. As the expected variation in both time and frequency from $\epsilon$ and $n_0$ are predictable (given the complex exponential terms expressed above in Equation (5)), mobile terminals may typically evaluate the correlation of received symbols over time and frequency in order to accurately identify the time and frequency offset terms $n_0$ and $\epsilon$.

As the CRS symbols are spaced across the time-frequency resource grid according to the specific CRS pattern (as shown in FIG. 2), mobile terminal 102 may be able to evaluate the variations in phase over time and frequency at each of the REs containing a CRS symbol. As shown in FIG. 2 and as detailed in Section 6.10.1 of 3GPP TS 36.211, the CRS symbols may occur every 6 subcarriers in frequency where the exact subcarriers within each RB that contain CRS symbols may depend on the PCI while occurring every 7 OFDM symbols in time (assuming normal CP length, every 6 OFDM symbols in time for extended CP).

Mobile terminal 102 may therefore be able to obtain a raw channel estimate at each CRS position by comparing the received CRS symbols to local copies of the CRS symbols. Mobile terminal 102 may then evaluate the raw channel estimates in order to identify the time and frequency offsets by analyzing the variations in phase of the raw channel estimates over frequency and time, respectively.

Mobile terminal 102 may obtain the raw channel estimates by 'demodulating' each received CRS symbol, i.e. each $R_l^{p,q}(m)$ occurring at an RE (m, l) that contains a CRS symbol, with local CRS symbol copies $S_l^p(m)$ by calculating the product of $R_l^{p,q}(m)$ and the complex conjugate of $S_l^p(m)$. As mobile terminal 102 may only be able to obtain raw channel estimates at CRS positions, i.e. at each RE (m, l) that contains a CRS symbol, mobile terminal 102 may additionally 'interpolate' between raw channel estimates in order to obtain interpolated raw channel samples at intermediate positions. For example, as shown in FIG. 2 mobile terminal 102 may obtain intermediate raw channel samples at the $0^{th}$ and $4^{th}$ symbols of each time slot on every $3^{rd}$ subcarrier by interpolating the raw channels over time and frequency. Mobile terminal 102 may then utilize the resulting interpolated raw channel equivalently to the actual raw channel samples during time and frequency offset estimation, which may yield an increased offset estimation range.

Figure 3:
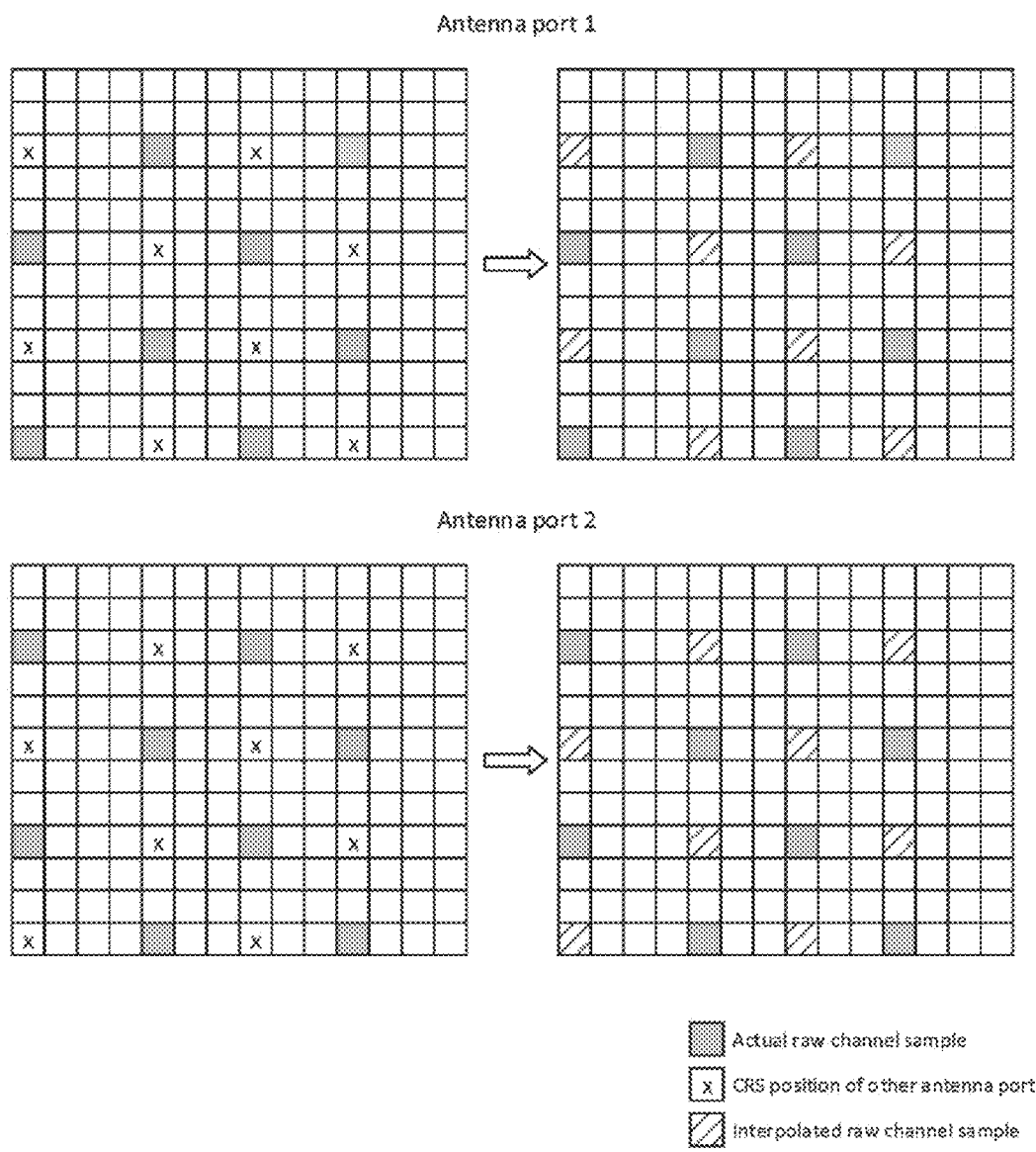
FIG. 3 shows a resource grid containing interpolated reference symbols.

Furthermore, as previously indicated each transmit antenna port may transmit CRS symbols with different REs. In order to allow for accumulation of offset estimation results over different antenna ports, e.g. by averaging correlation values of offset estimation results for the same RE on different antenna ports, mobile terminal 102 may interpolate the actual raw channel samples to obtain interpolated raw channel samples at the same RE positions at other transmit antenna ports. FIG. 3 illustrates an exemplary scenario in which mobile terminal 102 may interpolate the raw channel samples obtained at CRS positions of antenna port 1 of cell 104a to obtain interpolated raw channel samples at CRS positions of antenna port 2 of cell 104a (where cell 104a has two total antenna ports) and vice versa at CRS positions of antenna port 2 to obtain interpolated raw channel samples at CRS positions of antenna port 1. Accordingly, as shown in FIG. 3 mobile terminal 102 may obtain raw channel samples (either actual or interpolated) at overlapping REs for each of antenna ports 1 and 2, which may allow mobile terminal 102 to accumulate offset estimation results (e.g. intermediate raw channel sample correlation results) across multiple transmit antenna ports due to the overlapping positions of the raw channel samples.

For example, mobile terminal 102 may utilize interpolation in order to produce raw channel samples (both actual and interpolated) on every $6^{th}$ subcarrier at the $0^{th}$ and $4^{th}$ OFDM symbols of each slot (i.e. the $0^{th}$, $4^{th}$, $7^{th}$, and $11^{th}$ symbols of each subframe). Accordingly, as the actual raw channel samples are already spaced every $6^{th}$ subcarrier, mobile terminal 102 may calculate the raw channel samples as $$\hat{H}_l^{p,q}(6m') = R_l^{p,q}(6m')(S_l^p(6m'))^* \qquad (7)$$
$$= \frac{1}{N} \frac{\sin(\pi\epsilon)}{\sin\left(\frac{\pi\epsilon}{N}\right)} e^{\frac{j2\pi\epsilon}{N}\{l(N+N_{cp})+N_{cp}+n_0+\frac{(N-1)}{2}\}} e^{\frac{j2\pi 6m'n_0}{N}} H_l^{p,q}(6m') +$$
$$\sum_{p=0}^{P-1} \hat{I}_{l,ICI}^{p,q}(6m') + \hat{Z}_l^q(6m'),$$

i.e. may calculate each raw channel sample $\hat{H}_l^{p,q}(6m')$ as the product of a received CRS symbol $R_l^{p,q}(6m')$ and the complex conjugate of the corresponding local CRS copy $S_l^p(6m')$. As the CRS symbols occur every 6 subcarriers, 6m' may give the subcarrier positions of the CRS symbols across the $N_{RB}$ resource blocks (thus yielding $2N_{RB}$ total CRS symbols across the system bandwidth during a given CRS symbol period). The exemplary case of m'=0, 1, . . . , $2N_{RB}-1$ may thus hold for PCIs that place CRS symbols at the $0^{th}$ and $6^{th}$ subcarriers of each RB, where the start and end points of m' may be shifted for other PCIs to reflect the offset of the evenly-spaced CRS symbol sequence in frequency, i.e. m'=$m_{offset}$, $m_{offset}+1$, . . . , $2N_{RB}-1-m_{offset}$ for a given $m_{offset}$ as the subcarrier location of the first CRS symbol within each RB.

Mobile terminal 102 may then interpolate the actual raw channel samples $\hat{H}_l^{p,q}(6m')$ obtained via the calculating in Equation (7) in order to obtain raw channel samples (either actual or interpolated) $\hat{H}_l^{p,q}(6m')$ for l=0, 4, 7, 11 of each subframe.

As can be seen in Equation (7), each channel sample $\hat{H}_l^{p,q}(6m')$ may contain a complex exponential term $$e^{\frac{j2\pi\epsilon}{N}\{l(N+N_{cp})+N_{cp}+n_0+\frac{(N-1)}{2}\}}$$

depending on $\epsilon$ that varies over time in l (where the remaining terms are constants) and a complex exponential term $$e^{\frac{j2\pi 6m'n_0}{N}}$$

depending on $n_0$ that varies over frequency in m. Accordingly, in order to determine $\epsilon$ and $n_0$ using a conventional single-dimensional time and frequency offset estimation technique, mobile terminal 102 may evaluate the correlation of the raw channel samples $\hat{H}_l^{p,q}(6m')$ over time to identify $\epsilon$ and over frequency to identify $n_0$.

More specifically, mobile terminal 102 may compute a correlation product of the raw channel estimates $\hat{H}_l^{p,q}(6m')$ at adjacent CRS subcarriers (separated every 6 subcarriers) during the same symbol period to identify the time offset $n_0$, i.e. may calculate a correlation product the raw channel estimates $\hat{H}_l^{p,q}(6m')$ over frequency to identify an estimate $\hat{n}_0$ for the time offset $n_0$. Mobile terminal 102 may calculate this correlation product as $$A_{l,n_0}^{p,q}(6) = \sum_{m'=0}^{2N_{RB}-2} \hat{H}_l^{p,q}(6m'+6)\left(\hat{H}_l^{p,q}(6m')\right)^* \quad (8)$$

$$= e^{\frac{j2\pi 6n_0}{N}} \sum_{m'=0}^{2N_{RB}-2} \left\{\frac{1}{N}\frac{\sin(\pi\varepsilon)}{\sin\left(\frac{\pi\varepsilon}{N}\right)}\right\}^2 H_l^{p,q}(6m'+6)(H_l^{p,q}(6m'))^* +$$

other terms i.e. where the correlation product is the inner or scalar product of $(\hat{H}_l^{p,q}(6m'))^*$ and $\hat{H}_l^{p,q}(6m'+6)$.

As the actual channels $H_l^{p,q}(6m'+6)$ and $H_l^{p,q}(6m')$ are only separated by 6 subcarriers, $H_l^{p,q}(6m'+6)$ and $H_l^{p,q}(6m')$ may be approximately equivalent. Accordingly, the multiplication of $H_l^{p,q}(6m'+6)$ with the complex conjugate of $H_l^{p,q}(6m')$ may yield a product that is almost entirely real (due to the property that the product AA* will be exclusively real for a complex number A). As real terms have no phase contribution, the only remaining term in $A_{l,n_0}^{p,q}(6)$ with a phase contribution is the complex exponential term $$e^{\frac{j2\pi 6n_0}{N}}$$

with phase dependent on $n_0$. In other words, the only component of $A_{l,n_0}^{p,q}(6)$ that contributes to the phase would be the complex exponential term depending on time offset $n_0$.

Mobile terminal 102 may then accumulate $A_{l,n_0}^{p,q}(6)$ over the $4^{th}$ and $7^{th}$ OFDM symbols of multiple subframes for each transmit and receive antenna port by calculating $A_{l,n_0}^{p,q}(6)$ from raw channel samples (which may be either interpolated or actual) at the $4^{th}$ and $7^{th}$ OFDM symbols for each combination of p and q and averaging the result to obtain an accumulated frequency correlation product $A_{n_0}(6)$. Mobile terminal 102 may then isolate the phase of $A_{n_0}(6)$ via an inverse tangent operation $$\left(\text{thus obtaining } \frac{2\pi 6n_0}{N}\right)$$

and solve for $n_0$ as $$\hat{n}_0 = \frac{N}{2\pi 6}\tan^{-1}\left(\frac{imag(A_{n_0}(6))}{real(A_{n_0}(6))}\right) \quad (9)$$

Accordingly, mobile terminal 102 may obtain an estimated time offset $\hat{n}_0$, where the estimation range may be $$-\frac{N}{12}T_s \le \hat{n}_0 \le \frac{N}{12}T_s \quad (10)$$
$$-170.66\,T_s \le \hat{n}_0 \le 170.66\,T_s$$

where $T_s$ is the sampling period. It is noted the above time offset estimation emphasizes an LTE context in which the reference symbols are spaced every 6 subcarriers; however, the correlation product computation may be modified to address other analogous cases involving other reference symbols that are evenly spaced in frequency. Furthermore, the above time offset estimation may also be modified via interpolation to utilize raw channel samples $\hat{H}_l^{p,q}(3m')$ that are spaced every 3 subcarriers as opposed to the 6-subcarrier spacing utilized above; however, such may substantially effect the time offset estimation range and thus may be necessary.

Mobile terminal 102 may then separately evaluate the correlation product of the raw channel samples $\hat{H}_l^{p,q}(6m')$ over time in order to obtain an estimated frequency offset $\hat{\varepsilon}$. Similarly to the single-dimensional time offset estimation procedure, mobile terminal 102 may calculate the correlation product of the raw channel samples $\hat{H}_l^{p,q}(6m')$ at adjacent CRS symbols on the same subcarrier to identify an estimate $\hat{\varepsilon}$ for the frequency offset $\varepsilon$. As detailed regarding FIGS. 2 and 3, mobile terminal 102 may interpolate the raw channel estimates in order to obtain raw channel samples (either actual or interpolated) at every $0^{th}$, $4^{th}$, $7^{th}$, and $11^{th}$ symbol period of every $6^{th}$ subcarrier of each subframe. Accordingly, mobile terminal 102 may then calculate the frequency correlation product using the raw channel samples from the $4^{th}$ and $7^{th}$ symbols on every $6^{th}$ subcarrier of each slot as $$A_{7,4}^{p,q}(x) = \sum_{m'=0}^{2N_{RB}-1} \hat{H}_7^{p,q}(6m')\left(\hat{H}_4^{p,q}(6m')\right)^* \quad (11)$$

$$= e^{\frac{j2\pi\varepsilon[3(N+N_{cp})]}{N}} \sum_{m'=0}^{2N_{RB}-1} \left\{\frac{1}{N}\frac{\sin(\pi\varepsilon)}{\sin\left(\frac{\pi\varepsilon}{N}\right)}\right\}^2 H_7^{p,q}(6m')(H_4^{p,q}(6m'))^* +$$

other terms

Analogous to the time correlation case, the product of $H_7^{p,q}(6m')$ and the conjugate of $H_4^{p,q}(6m')$ may be almost entirely real due to the near equivalency of the channels at the $4^{th}$ and $7^{th}$ symbols. Accordingly, the only phase contribution may be given by the complex exponential term $$e^{\frac{j2\pi\varepsilon[3(N+N_{cp})]}{N}}$$

depending on $\varepsilon$.

Mobile terminal 102 then accumulate $A_{7,4}^{p,q}(x)$ over each combination of p and q for multiple subframes to obtain an accumulated frequency correlation product $A_\varepsilon(x)$. Mobile terminal 102 may then isolate the phase of $A_\varepsilon(x)$ with an inverse tangent and solve for the estimated frequency offset $\hat{\varepsilon}$ as $$\hat{\varepsilon} = \frac{N}{2\pi * 3(N + N_{cp})}\tan^{-1}\left(\frac{imag(A_\varepsilon(x))}{real(A_\varepsilon(x))}\right) \quad (12)$$

Mobile terminal 102 may thus obtain a frequency offset estimate $\hat{\varepsilon}$ with normalized estimation range of $$-\frac{N}{6(N+N_{cp})} \le \hat{\varepsilon} \le \frac{N}{6(N+N_{cp})} \quad (13)$$

which, for a 15 kHz subcarrier spacing, equates to an actual frequency offset estimation range of $$-\frac{N*15000}{6(N+N_{cp})} \le \hat{f}_0 \le \frac{N*15000}{6(N+N_{cp})} \quad (14)$$

$$-2335.7 \text{ Hz} \le \hat{f}_0 \le 2335.7 \text{ Hz}$$

Accordingly, mobile terminal 102 may perform the time and offset estimation procedures separately (in any order or in parallel) to obtain time and frequency offset estimates $\hat{n}_0$ and $\hat{\epsilon}$. While this single-dimensional time and frequency offset estimation procedure may be effective in many cases, in an advantageous aspect of this disclosure mobile terminal 102 may instead utilize a two-dimensional offset estimation procedure to jointly estimate both $\hat{n}_0$ and $\hat{\epsilon}$ in a single combined procedure. As such a joint estimation procedure may consider both frequency and time offset estimates simultaneously, the joint estimation procedure of this disclosure may yield a substantially reduced estimation variance, thus producing more accurate time and frequency offset estimates. Accordingly, this joint estimation procedure may offer improved performance over the separated single-dimensional offset estimation procedure detailed above.

More specifically, as opposed to calculating the correlation products $A_{n_0}(6)$ and $A_\epsilon(x)$ over only one of time or frequency (i.e. by locking either time or frequency and calculating the correlation products in the other dimensions), mobile terminal 102 may instead calculate correlation products over both time and frequency and evaluate the resulting correlation products to identify both $n_0$ and $\epsilon$.

Figure 4:
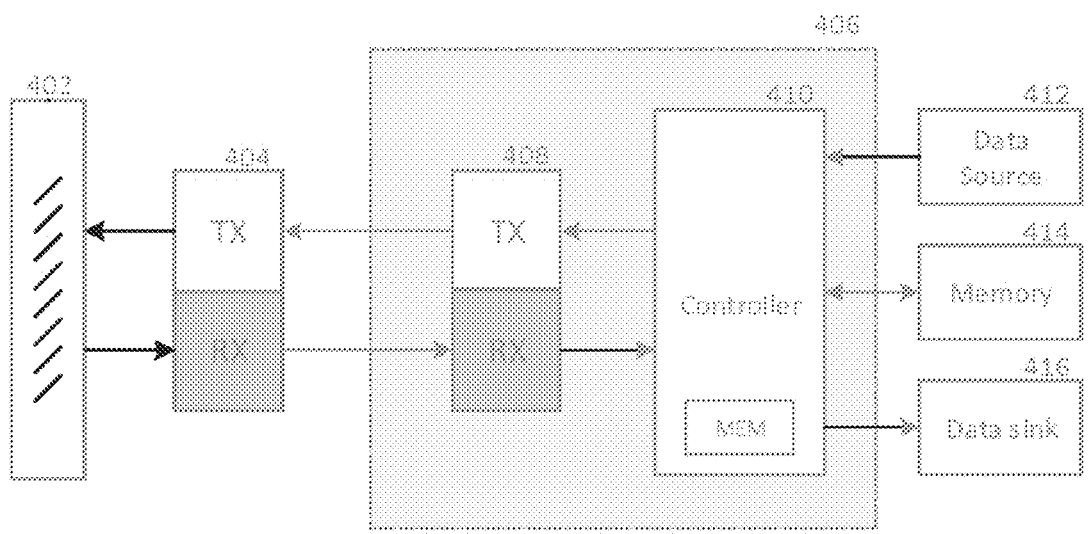
FIG. 4 shows an internal configuration of a mobile terminal.

FIG. 4 shows an internal configuration of mobile terminal 102, which may be configured to perform the joint time and frequency offset estimation procedure of this disclosure. As shown in FIG. 4, mobile terminal 102 may include antenna system 402, radio frequency (RF) transceiver 404, baseband modem 406 (including physical layer processing circuit 408 and controller 410), data source 412, memory 414, and data sink 416. Although not explicitly shown in FIG. 4, mobile terminal 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, mobile terminal 102 may transmit and receive radio signals on one or more radio access networks. Baseband modem 406 may direct such communication functionality of mobile terminal 102 according to the communication protocols associated with each radio access network, and may execute control over antenna system 402 and RF transceiver 404 in order to transmit and receive radio signals according to the formatting and scheduling parameters defined by each communication protocol.

Mobile terminal 102 may transmit and receive radio signals with antenna system 102, which may be a single antenna or an antenna array composed of multiple antennas and may additionally include analog antenna combination and/or beamforming circuitry. In the receive path (RX), RF transceiver 404 may receive analog radio frequency signals from antenna system 402 and perform analog and digital RF front-end processing on the analog radio frequency signals to produce digital baseband samples (e.g. In-Phase/Quadrature (IQ) samples) to provide to baseband modem 404. RF transceiver 404 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 404 may receive digital baseband samples from baseband modem 206 and perform analog and digital RF front-end processing on the digital baseband samples to produce analog radio frequency signals to provide to antenna system 402 for wireless transmission. RF transceiver 404 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 406 to produce the analog radio frequency signals for wireless transmission by antenna system 402. Baseband circuit 406 may control the RF transmission and reception of RF transceiver 404, including specifying the transmit and receive radio frequencies for operation of RF transceiver 404.

As shown in FIG. 4, baseband modem 406 may include physical layer processing circuit 408, which may perform physical layer (Layer 1) transmission and reception processing to prepare outgoing transmit data provided by controller 410 for transmission via RF transceiver 404 and prepare incoming received data provided by RF transceiver 404 for processing by controller 410. Physical layer processing circuit 410 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 408 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 4, physical layer processing circuit 408 may include a control circuit such as a processor configured to control the various hardware and software processing components of physical layer processing circuit 408 in accordance with physical layer control logic defined by the communications protocol for the relevant radio access technologies. Furthermore, while physical layer processing circuit 408 is depicted as a single component in FIG. 4, physical layer processing circuit 408 may be collectively composed separate sections of physical layer processing circuitry where each respective section is dedicated to the physical layer processing of a particular radio access technology.

Mobile terminal 102 may be configured to operate according to one or more radio access technologies, which may be directed by controller 410. Controller 410 may thus be responsible for controlling the radio communication components of mobile terminal 102 (antenna system 402, RF transceiver 404, and physical layer processing circuit 408) in accordance with the communication protocols of each supported radio access technology, and accordingly may represent the Access Stratum and Non-Access Stratum (NAS) (also encompassing Layer 2 and Layer 3) of each supported radio access technology. Controller 410 may be structurally embodied as a protocol processor configured to execute protocol software (retrieved from controller memory MEM as shown in FIG. 4) and subsequently control the radio communication components of mobile terminal 102 in order to transmit and receive communication signals in accordance with the corresponding protocol control logic defined in the protocol software.

Controller 410 may therefore be configured to manage the radio communication functionality of mobile terminal 102 in order to communicate with the various radio and core network components of radio communication network 100, and accordingly may be configured according to the communication protocols for both the LTE network and the GSM/UMTS legacy network. Controller 410 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 410 may be responsible for directing radio communication activity of mobile terminal 102 according to the communication protocols of the LTE and legacy networks. As previously noted regarding physical layer processing circuit 408, one or both of antenna system 402 and RF transceiver 404 may similarly be partitioned into multiple dedicated components that each respectively correspond to one or more of the supported radio access technologies. Depending on the specifics of each such configuration and the number of supported radio access technologies, controller 410 may be configured to control the radio communication operations of mobile terminal 102 in accordance with a master/slave RAT hierarchical or multi-SIM scheme.

Mobile terminal 102 may further comprise data source 412, memory 414, and data sink 416, where data source 412 may include sources of communication data above controller 410 (i.e. above the NAS/Layer 3) and data sink 412 may include destinations of communication data above controller 410 (i.e. above the NAS/Layer 3). Such may include, for example, an application processor of mobile terminal 102, which may be configured to execute various applications and/or programs of mobile terminal 102 at an application layer of mobile terminal 102, such as e.g. an Operating System (OS), a User Interface (UI) for supporting user interaction with mobile terminal 102, and/or various user applications. The application processor may interface with baseband modem 406 (as data source 412/data sink 416) as an application layer to transmit and receive user data such as voice data, audio/video/image data, messaging data, application data, basic Internet/web access data, etc., over a the radio network connection(s) provided by baseband modem 406. Data source 412 and data sink 416 may additionally represent various user input/output devices of communication device 102, such as display(s), keypad(s), touchscreen(s), speaker(s), external button(s), camera(s), microphone(s), etc., which may allow a user of mobile terminal 102 to control various communication functions of mobile terminal 102 associated with user data.

Memory 414 may embody a memory component of mobile terminal 102, such as e.g. a hard drive or another such permanent memory device. Although not explicitly depicted in FIG. 4, the various other components of mobile terminal 102 shown in FIG. 4 may additionally each include integrated permanent and non-permanent memory components, such as for storing software program code, buffering data, etc.

Figure 5:
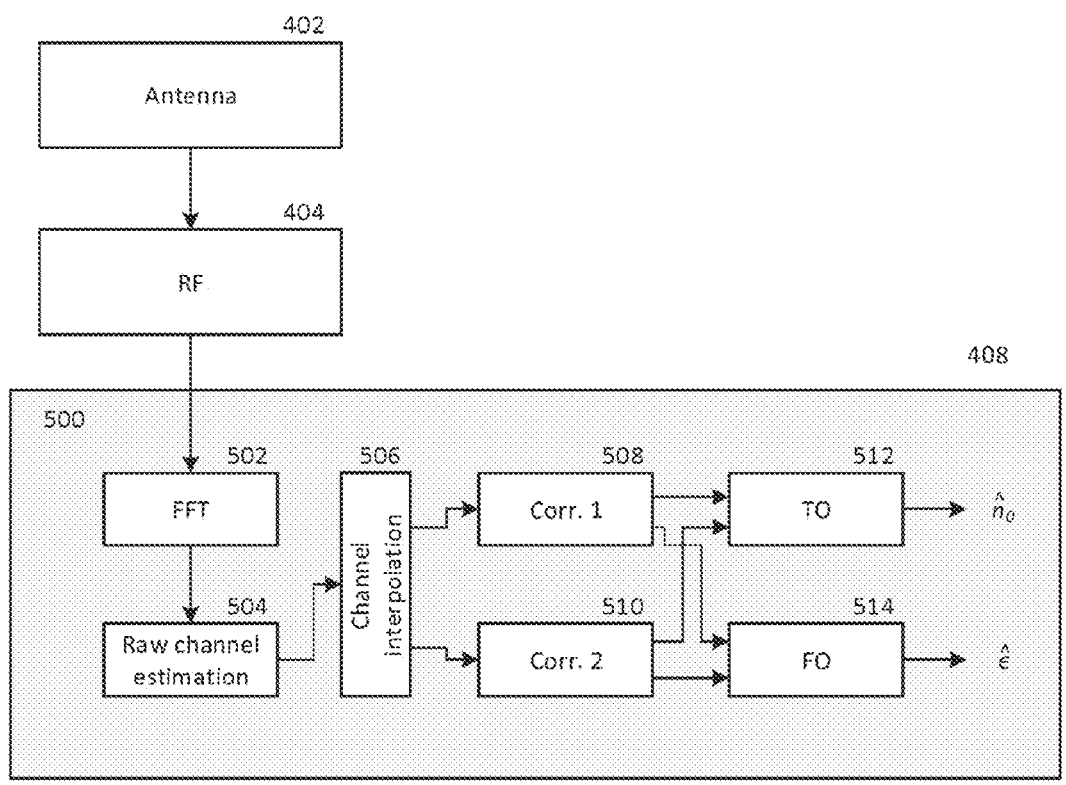
FIG. 5 shows offset estimation circuitry of a mobile terminal.

FIG. 5 shows an internal diagram of mobile terminal 102 depicting the components related to the joint time and frequency offset estimation procedure of this disclosure. Accordingly, the illustrated depiction of FIG. 5 may omit certain components of mobile terminal 102 that are not directly related to the joint time and frequency offset estimation procedure in addition to control, power, and clock lines.

As shown in FIG. 5, physical layer processing circuit 408 may include offset estimation circuitry 500, which may be composed of FFT circuit 502, raw channel estimation circuit 504, channel interpolation circuit 506, correlation circuits 508 and 510, time offset estimation circuit 512, and frequency offset estimation circuit 514. Each of the aforementioned components of offset estimation circuitry 500 may be structurally realized as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Skilled persons will appreciate the possibility to embody each component of offset estimation circuitry 500 in software and/or software according to the functionality detailed herein.

As will be detailed, in an aspect of this disclosure offset estimation circuitry 500 may be a circuit arrangement comprising a channel estimation circuit (e.g. channel estimation circuit 504 and channel interpolation circuit 506) configured to obtain a channel estimate composed of a plurality of channel samples positioned over a range of time and frequency locations of a received signal, a first calculation circuit (e.g. correlation circuit 508) configured to calculate a first correlation product of the channel estimate jointly over time and frequency and a second calculation circuit (e.g. correlation circuit 510) configured to calculate a second correlation product of the channel estimate, a time offset circuit (e.g. time offset estimation circuit 512) configured to determine a time offset from the first correlation product and the second correlation product, and a frequency offset circuit (e.g. frequency offset estimation circuit 514) configured to determine a frequency offset from the first correlation product and the second correlation product.

FIG. 6 shows method 600, which may be executed by mobile terminal 102 as depicted in FIG. 5 to perform the joint offset estimation procedure of this disclosure. As previously indicated, mobile terminal 102 may calculate correlation products of the raw channel samples over both time and frequency and evaluate the correlation products in order to jointly determine the time and frequency offsets in a two-dimensional procedure.

Mobile terminal 102 may first receive a radio signal via antenna 402 and RF transceiver 404 in 602, which may be an LTE radio signal as introduced above and detailed regarding FIGS. 2 and 3. RF transceiver 404 may be responsible for performing RF demodulation and analog-to-digital conversion (e.g. as part of an IQ demodulation procedure) in order to provide time-domain baseband (IQ) samples to baseband modem 406. Accordingly, in performing RF demodulation RF transceiver 404 may tune an oscillator of RF transceiver 404 to a target carrier frequency, such as the center frequency of cell 104a as shown in FIG. 1.

Mobile terminal 102 may initially synchronize the tuning frequency of RF transceiver 404 during an initial synchronization process, such as one based on detecting synchronization symbols including Primary Synchronization Signals (PSSs) and Secondary Synchronization Signals (SSSs) transmitted by cell 104a. Mobile terminal 102 may additionally obtain initial timing synchronization information via PSS and SSS detection, which may provide mobile terminal 102 with an initial estimate of each symbol and subframe boundary in addition to the PCI and antenna port information of cell 104a. However, the initial time and frequency synchronization information may be inaccurate and/or may drift over time; accordingly, a normalized carrier frequency offset ϵ may arise as the difference between the tuning frequency of RF transceiver 404 and the actual center frequency of cell 104a (normalized over the subcarrier spacing) while a time offset $n_0$ may arise as difference between the symbol boundary assumed by mobile terminal 102 and the actual symbol boundary of the radio signal transmitted by cell 104a.

Accordingly, the time-domain baseband samples obtained by RF transceiver 404 may be of the form $r_i^q(n)$ of Equation (3), where the offsets ϵ and $n_0$ may corrupt the received signal via phase shifts. Accordingly, mobile terminal 102 may utilize offset estimation circuitry 500 in order to accurately estimate the time and frequency offsets.

RF transceiver 404 may provide the resulting time-domain baseband samples to physical layer processing circuit 408 of baseband modem 406. As shown in FIG. 5, FFT circuit 502 may apply a length-N forward FFT (over the system bandwidth) to the received time-domain baseband samples in 604 to convert the time-domain baseband samples to the frequency domain. FFT circuit 502 may thus produce an OFDM symbol for each m-th subcarrier of the form $R_l^{p,q}(m)$ of Equation (5), where each received OFDM symbol $R_l^{p,q}(m)$ is derived from the original transmit OFDM symbol $S_l^p(m)$ as modified by the channel $H_l^{p,q}(m)$, normalized carrier frequency offset ϵ, time offset $n_0$, ICI, and noise.

FFT circuit 502 may provide the baseband OFDM symbols $R_l^{p,q}(m)$ to raw channel estimation circuit 504, which may proceed to calculate the raw channel estimates $\hat{H}_l^{p,q}(6m')$ from the OFDM symbols $R_l^{p,q}(m)$ that are CRS positions in 606. As previously indicated, mobile terminal 102 may be able to identify the CRS positions based on the PCI of cell 104a and the number of transmit ports used by cell 104a; accordingly, channel estimation circuit 504 may identify the CRS positions (by subcarrier m and symbol l) and calculate the raw channel samples $\hat{H}_l^{p,q}(6m')$ for each CRS position according to Equation (7) by retrieving a complex conjugate of a local copy of the CRS symbol $S_l^p(6m')$ (either locally stored or locally generated) and multiplying $(S_l^p(6m'))^*$ by $R_l^{p,q}(6m')$ (assuming a 6-subcarrier CRS spacing as previously detailed).

Channel estimation circuit 504 may calculate raw channel estimates $\hat{H}_l^{p,q}(6m')$ for each CRS position in 606 and may provide raw channel estimates $\hat{H}_l^{p,q}(6m')$ to channel interpolation circuit 506, which may perform interpolation in time and/or frequency in 608 in order to produce interpolated raw channel estimates. For example, as detailed regarding FIG. 3, channel interpolation circuit 506 may perform interpolation in 608 to generate the interpolated channel samples, thus obtaining a complete set of raw channel samples (both interpolated and actual) that overlap on all transmit antenna ports of cell 104a. As noted above, such may allow offset estimation circuitry 500 to perform accumulation over each of the transmit antenna ports, thus increasing estimation accuracy. For example, channel interpolation circuit 506 may perform interpolation in order to produce a complete set of raw channel samples (including both interpolated and actual) in at least the $4^{th}$ and $7^{th}$ symbols of each subframe on every $6^{th}$ subcarrier.

Channel interpolation circuit 506 may then provide the raw channel estimates (including both interpolated and actual) $\hat{H}_l^{p,q}(6m')$ to correlation circuits 508 and 510. Correlation circuits 508 and 510 may then each calculate a two-dimensional correlation product over time and frequency in 610, which offset estimation circuitry 500 may later use in order to solve for the time and frequency offsets $n_0$ and ϵ. More specifically, in 610 correlation circuit 508 may calculate a first correlation product $A_{7,4\epsilon,n_0}^{p,q,1}(x)$ (for each p and q over multiple subframes) as $$A_{7,4,\epsilon,n_0}^{p,q,1}(x) = \sum_{m'=0}^{2N_{RB}-2} \hat{H}_7^{p,q}(6m')(\hat{H}_4^{p,q}(6m'+6))^* \quad (15)$$

$$= e^{\frac{j2\pi[\epsilon3(N+N_{cp})-6n_0]}{N}} \sum_{m'=0}^{2N_{RB}-2} \left\{\frac{1}{N}\frac{\sin(\pi\epsilon)}{\sin\left(\frac{\pi\epsilon}{N}\right)}\right\}^2 \cdot$$

$$H_7^{p,q}(6m')(H_4^{p,q}(6m'+6))^* + \text{other terms}$$

while correlation circuit 510 may calculate a second correlation product $A_{7,4,\epsilon,n_0}^{p,q,2}(x)$ (for each p and q over multiple subframes) as $$A_{7,4,\epsilon,n_0}^{p,q,2}(x) = \sum_{m'=0}^{2N_{RB}-2} \hat{H}_7^{p,q}(6m'+6)(\hat{H}_4^{p,q}(6m'))^* \quad (16)$$

$$= e^{\frac{j2\pi[\epsilon3(N+N_{cp})-6n_0]}{N}} \sum_{m'=0}^{2N_{RB}-2} \left\{\frac{1}{N}\frac{\sin(\pi\epsilon)}{\sin\left(\frac{\pi\epsilon}{N}\right)}\right\}^2 \cdot$$

$$H_7^{p,q}(6m'+6)(H_4^{p,q}(6m'))^* + \text{other terms}$$

Figure 7:
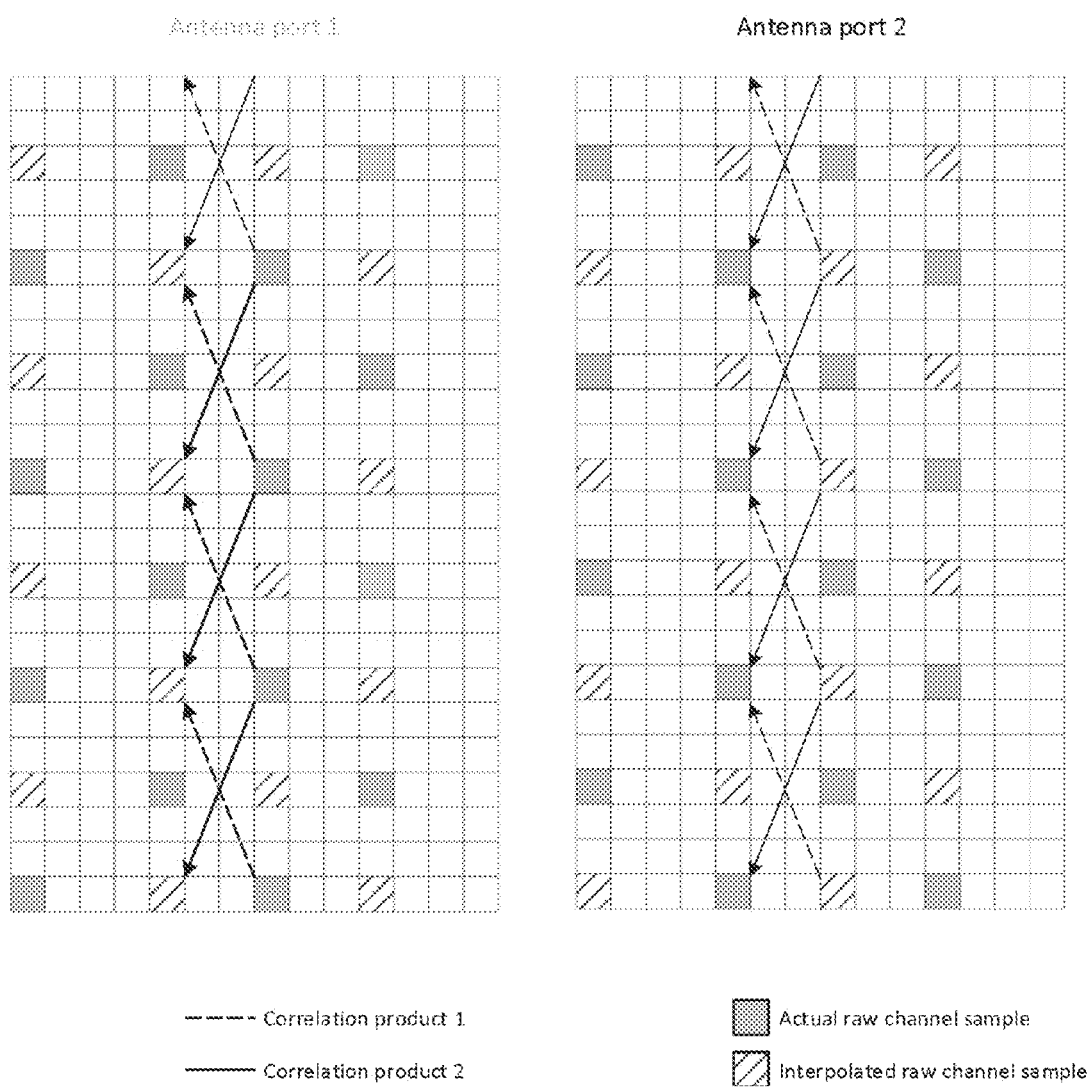
FIG. 7 shows an illustration of correlation product calculations with channel samples.
Figure 8:
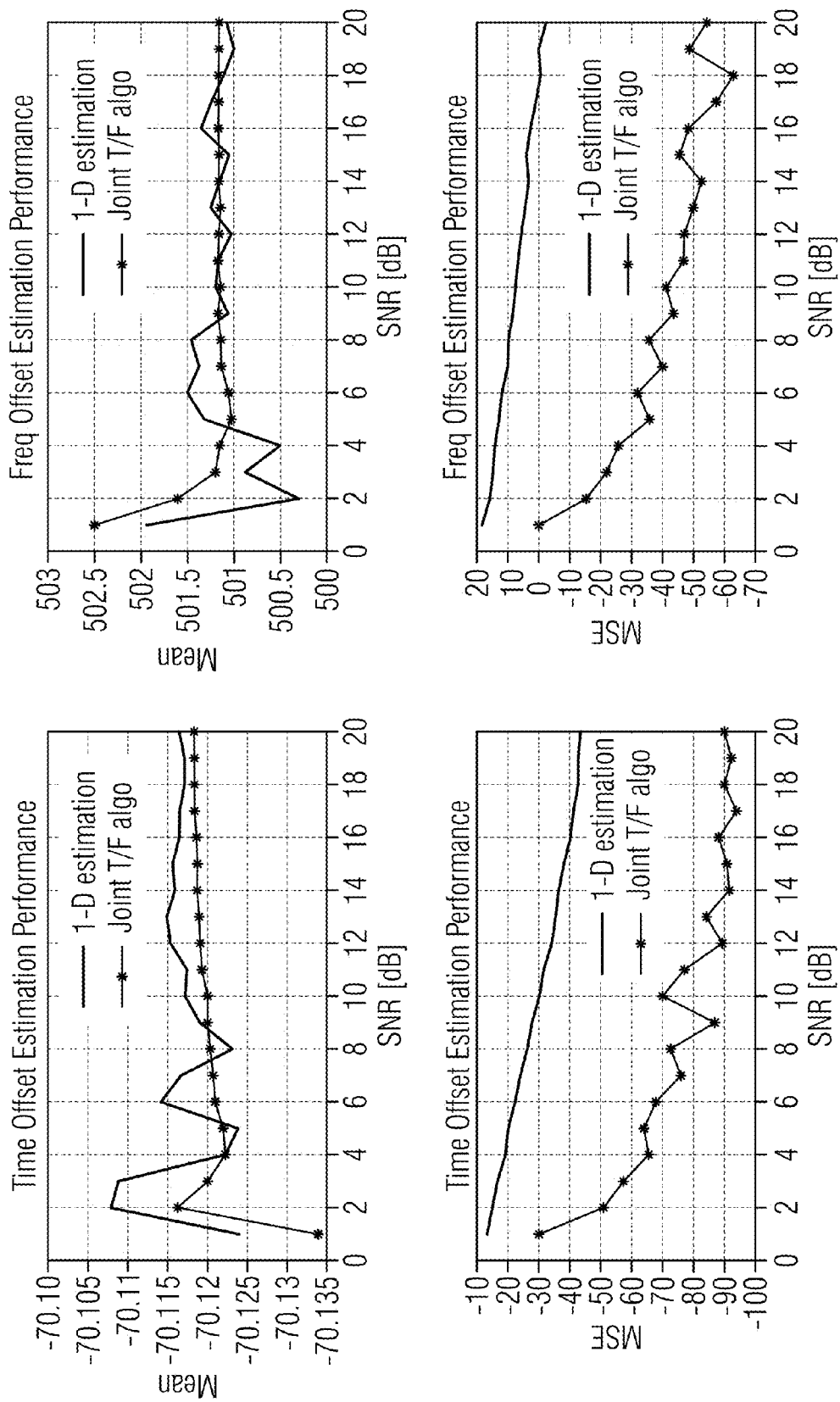
FIGS. 8-12 show simulation results for various different propagation channel models.
Figure 9:
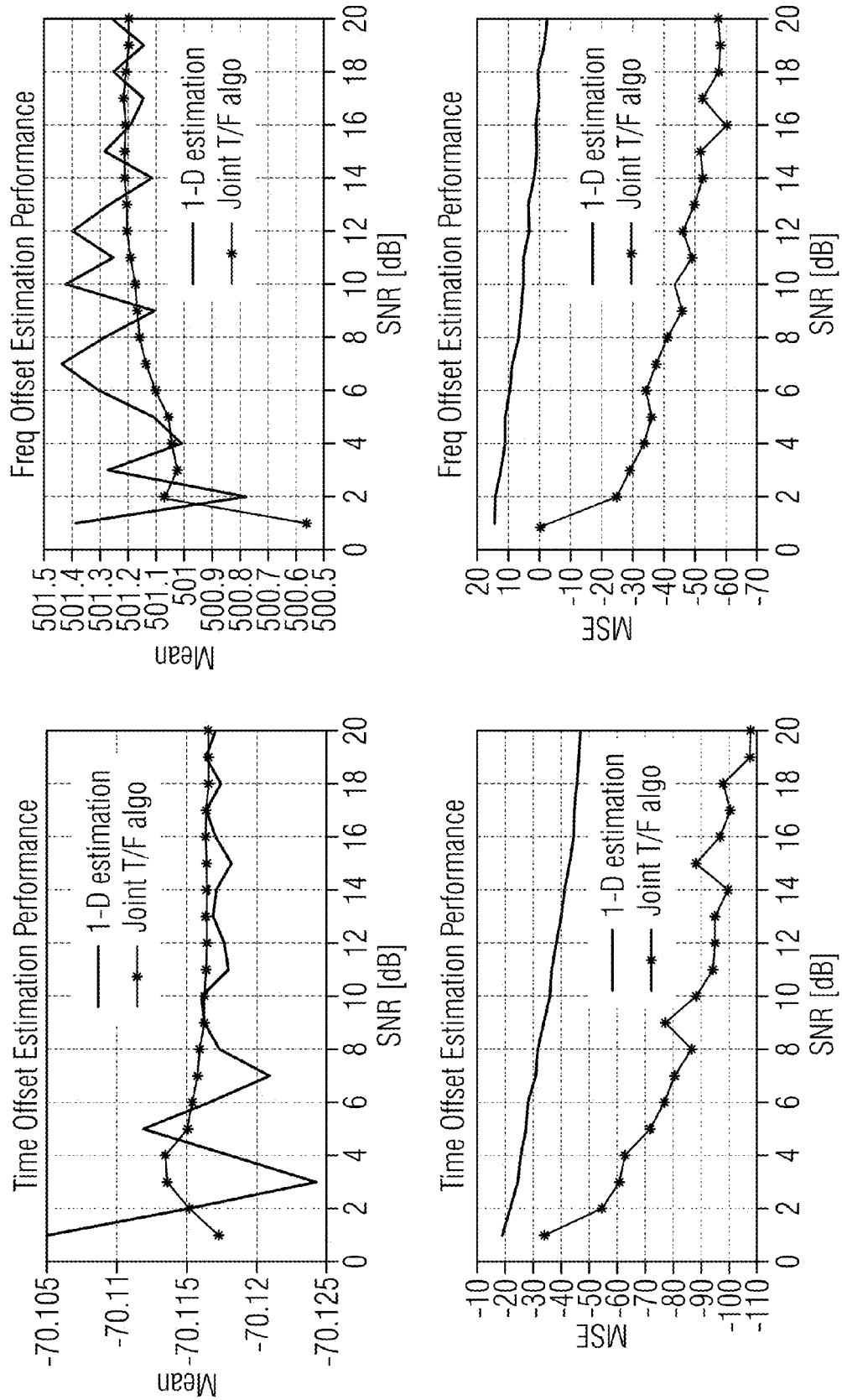
Figure 10:
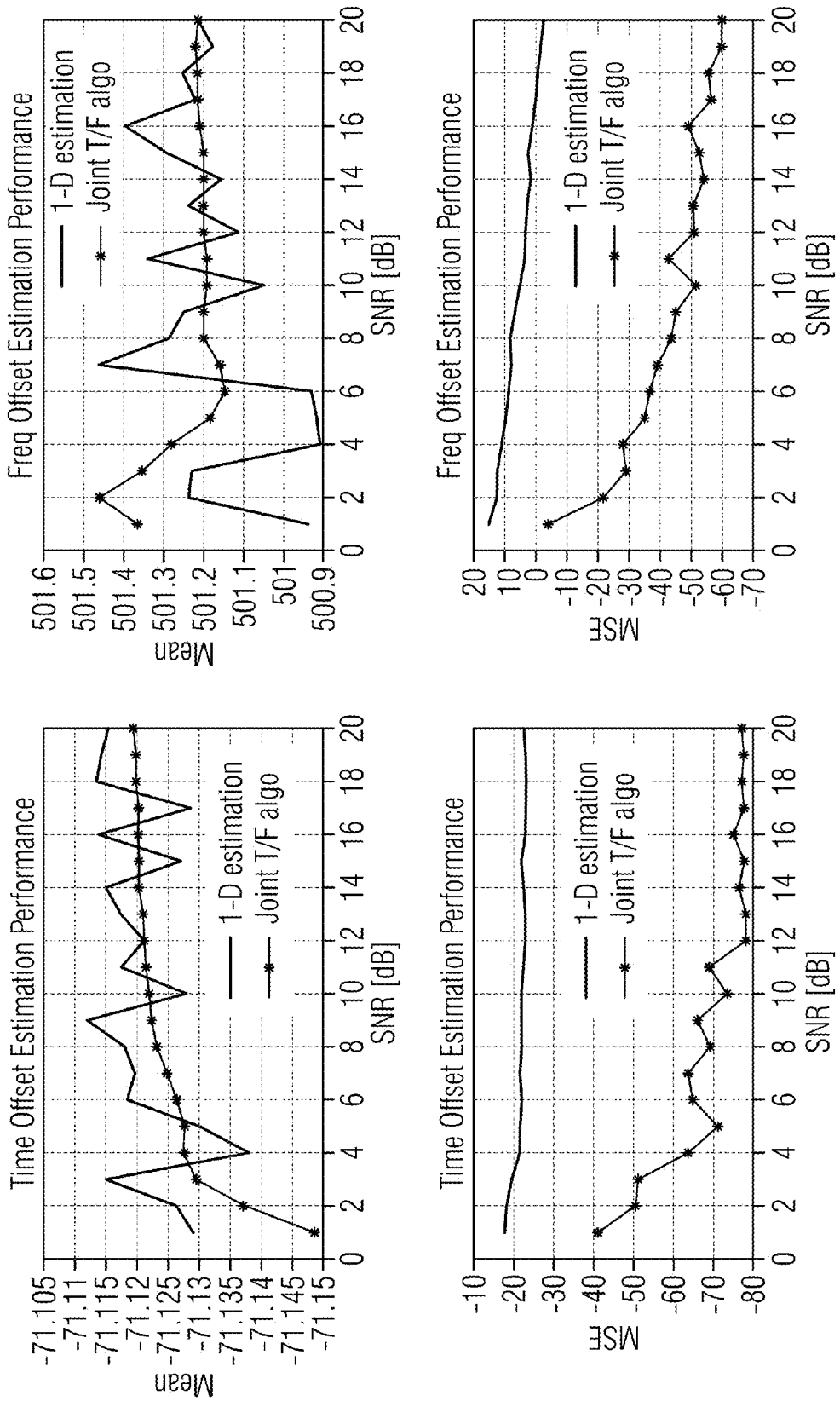
Figure 11:
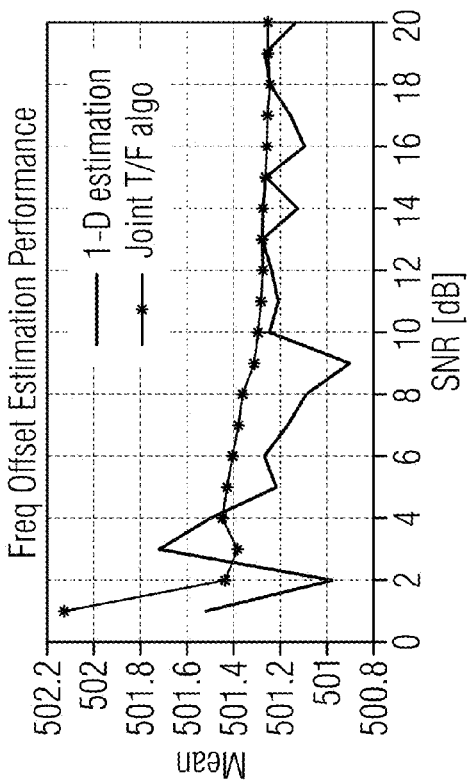
Figure 11:
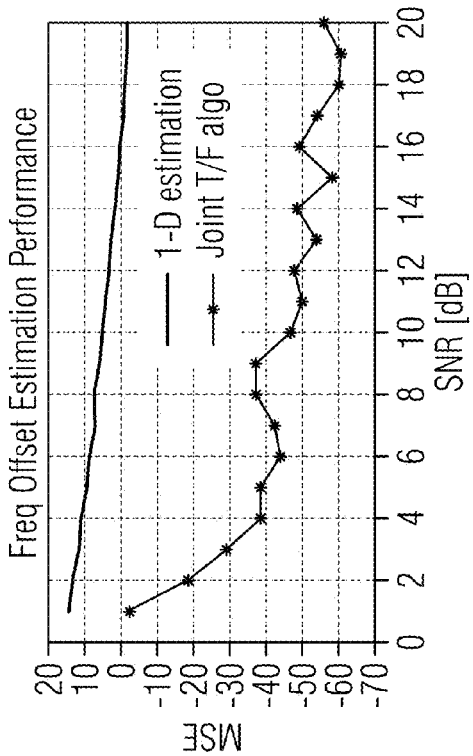
Figure 11:
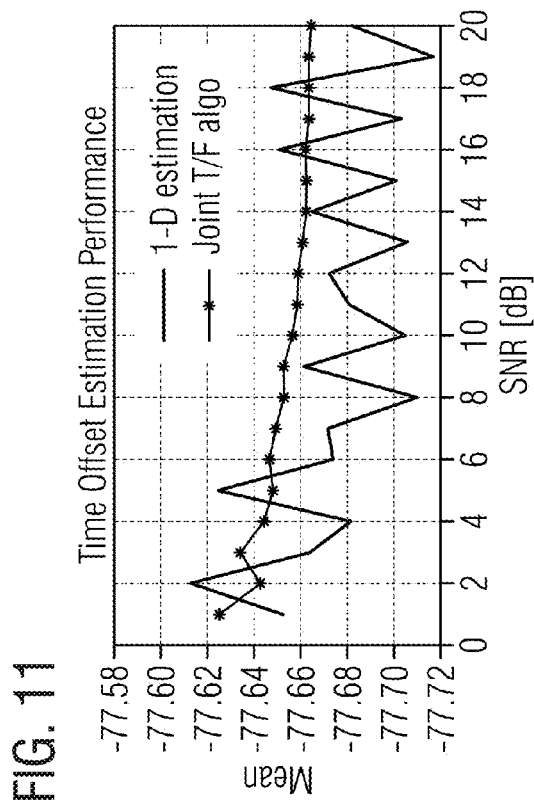
Figure 11:
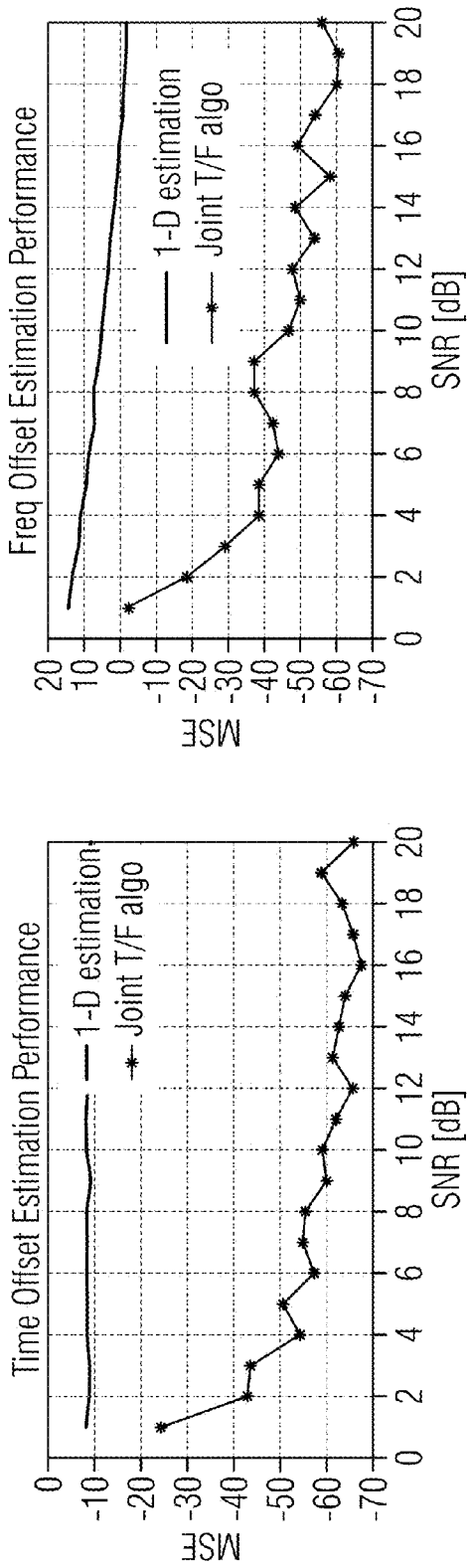
Figure 12:
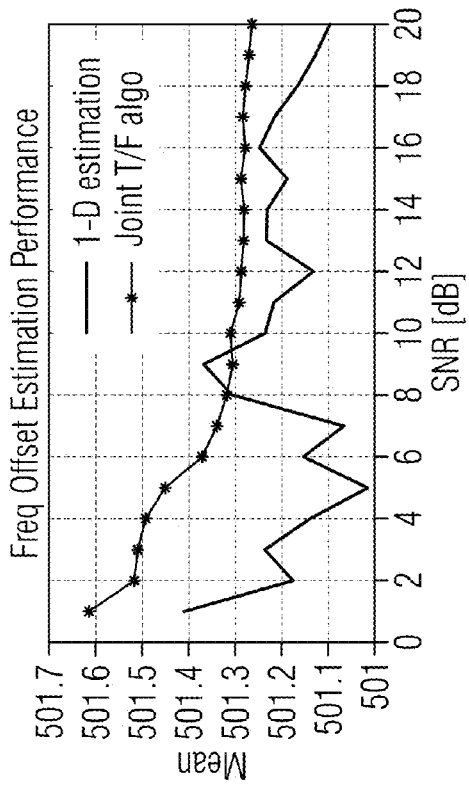
Figure 12:
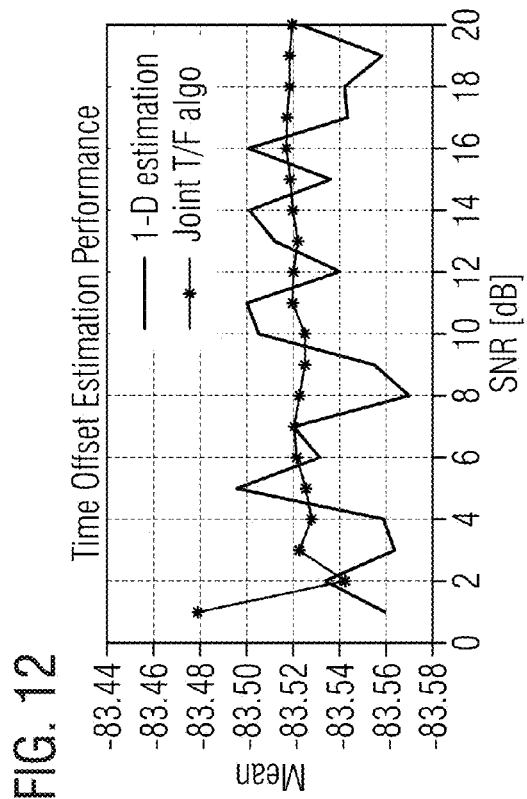
Figure 12:
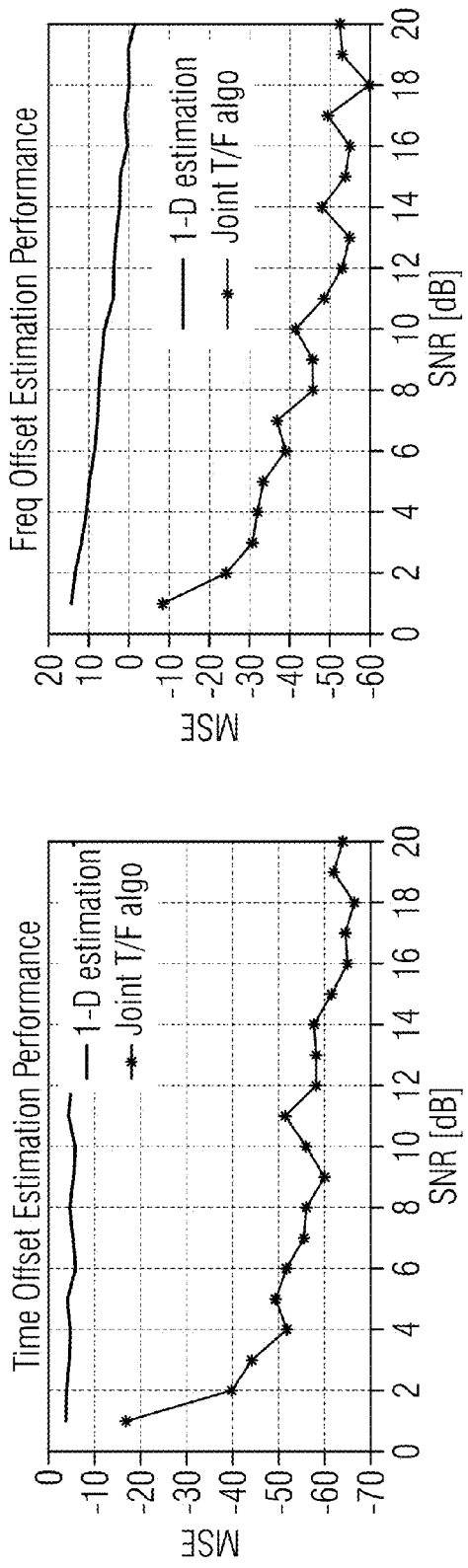

FIG. 7 shows an illustrative depiction of the calculation of the first and second correlation products by correlation circuits 508 and 510. As shown in FIG. 7, both the first and second correlation products may be correlation products over both time and frequency, which stands in contrast to the single-dimensional correlation products over either time or frequency performed in isolation in the conventional offset detection procedure. As depicted by the dashed and solid arrows corresponding to the first correlation product and the second correlation product, respectively, correlation circuit 508 may correlate raw channel samples at every $7^{th}$ OFDM symbol ($\hat{H}_7^{p,q}(6m')$) with the raw channel samples at the $4^{th}$ OFDM symbol of the same subframe located 6 subcarriers after ($\hat{H}_4^{p,q}(6m'+6)$) by computing the product of $\hat{H}_7^{p,q}(6m')$ and complex conjugate $(\hat{H}_4^{p,q}(6m'+6))^*$ and summing each product over the $N_{RB}$ resource blocks (two products per RB as shown in FIG. 7) to obtain the first correlation product $A_{7,4,\epsilon,n_0}^{p,q,1}(x)$. Likewise, correlation circuit 510 may correlate raw channel samples at every $7^{th}$ OFDM symbol ($\hat{H}_7^{p,q}(6m'+6)$) with the raw channel samples at the $4^{th}$ OFDM symbol of the same subframe located 6 subcarriers prior ($\hat{H}_4^{p,q}(6m')$) by computing the product of $\hat{H}_7^{p,q}(6m'+6)$ and complex conjugate $(\hat{H}_4^{p,q}(6m'))^*$ and summing each product over the $N_{RB}$ resource blocks to obtain the second correlation product $A_{7,4,\epsilon,n_0}^{p,q,2}(x)$.

Offset estimation circuitry 500 may perform 604-610 for each p-th transmit antenna port, q-th receive antenna port, and multiple subframes in order to obtain first and second correlation products for each combination. FIG. 7 depicts how correlation circuits 508 and 510 may calculate the first and second correlation products $A_{7,4,\epsilon,n_0}^{p,q,1}(x)$ and $A_{7,4,\epsilon,n_0}^{p,q,2}(x)$ for the antenna port 1 and 2 of cell 104a (assuming two total antenna ports). As shown by the dashed and solid lines, correlation circuit 508 may calculate the first correlation product from a $7^{th}$ OFDM symbol actual raw channel sample $\hat{H}_7^{p,q}(6m')$ to a $4^{th}$ OFDM symbol interpolated raw channel estimate $\hat{H}_4^{p,q}(6m'+6)$ spaced 6 subcarriers after while correlation circuit 510 may calculate the second correlation product from a $7^{th}$ OFDM symbol actual raw channel sample $\hat{H}_7^{p,q}(6m'+6)$ to a $4^{th}$ OFDM symbol interpolated raw channel estimate $\hat{H}_4^{p,q}(6m')$ spaced 6 subcarriers prior. Correlation circuits 508 and 510 may calculate the first and second correlation products for each transmit antenna port over multiple subframes Offset estimation circuitry 500 may similarly calculate first and second correlation products for each receive antenna port of mobile terminal 102 over multiple subframes and may accumulate the first and second correlation products over each combination of p and q for each subframe in 610 to obtain accumulated correlations products $A_{7,4,\epsilon,n_0}^1(x)$ and $A_{7,4,\epsilon,n_0}^2(x)$.

After obtaining the accumulated first and second correlation products $A_{7,4,\epsilon,n_0}^1(x)$ and $A_{7,4,\epsilon,n_0}^2(x)$, offset estimation circuitry 500 may be able to estimate $n_0$ and $\epsilon$ at time offset estimation circuit 512 and frequency offset estimation circuit 514 in 612. As both the first and second correlation products were calculated over both time and frequency, both may have a complex exponential term with phase dependent on both $n_0$ and $\epsilon$ as shown in Equations (15) and (16). However, the actual channel terms $H_7^{p,q}(6m')$ $(H_4^{p,q}(6m'+6))^*$ and $H_7^{p,q}(6m'+6)(H_4^{p,q}(6m'))^*$ in $A_{7,4,\epsilon,n_0}^1(x)$ and $A_{7,4,\epsilon,n_0}^2(x)$ may also produce almost entirely real products due to the near equivalence of the channel at adjacent CRS subcarriers; accordingly, the only substantial phase contribution to the first and second accumulated correlation products will be from the time offset $n_0$ and frequency offset $\epsilon$.

Accordingly, time offset estimation circuit 512 and frequency offset estimation circuit 514 may need to separately cancel out the $n_0$ and $\epsilon$ terms from the first and second accumulated correlation products to isolate an estimated $\hat{n}_0$ and estimated $\hat{\epsilon}$. Specifically, time offset estimation circuit 512 may calculate $\hat{n}_0$ in 612 as $$\hat{n}_0 = \frac{N}{24\pi} \tan^{-1}\left\{\frac{imag\left(A_{7,4,\epsilon,n_0}^2(x)\left(A_{7,4,\epsilon,n_0}^1(x)\right)^*\right)}{real\left(A_{7,4,\epsilon,n_0}^2(x)\left(A_{7,4,\epsilon,n_0}^1(x)\right)^*\right)}\right\} \quad (17)$$

where the offset estimation range of $\hat{n}_0$ ranges from $$-\frac{N}{24}Ts \leq \hat{n}_0 \leq \frac{N}{24}Ts \quad (18)$$
$$-85.33\,Ts \leq \hat{n}_0 \leq 85.33\,Ts$$

Accordingly, time offset estimation circuit 512 may calculate the product of the second accumulated correlation product and the complex conjugate of the first accumulated correlation product, isolate the phase of the product with an inverse tangent operation, and solve for $\hat{n}_0$ from the isolated phase. As can be seen from Equations (15) and (16), calculating the product of the second accumulated correlation product and the complex conjugate of the first accumulated correlation product will cancel out the $\epsilon$ terms from the complex exponential and leave only a phase term dependent on $n_0$ and constants. Accordingly, time offset estimation circuit 512 calculate time offset estimate $n_0$ from the first and second accumulated correlation products in 612.

Similarly, frequency offset estimation circuit 514 may cancel out $n_0$ from the first and second accumulated correlation products and solve for $\hat{\epsilon}$ in 612 as $$\hat{\epsilon} = \frac{N}{4\pi(N+N_{cp})} \tan^{-1}\left\{\frac{imag\left(A_{\epsilon,n_0}^2(x)\left(A_{\epsilon,n_0}^1(x)\right)\right)}{real\left(A_{\epsilon,n_0}^2(x)\left(A_{\epsilon,n_0}^1(x)\right)\right)}\right\} \quad (19)$$

where the offset estimation range of $\hat{\epsilon}$ ranges from $$-\frac{N}{12(N+N_{cp})} \leq \hat{\epsilon} \leq \frac{N}{12(N+N_{cp})} \quad (20)$$

which is converted from being normalized over subcarrier spacing to actual frequency offset as $$\frac{N*15000}{12(N+N_{cp})} \leq \hat{f}_0 \leq \frac{N*15000}{12(N+N_{cp})} \quad (21)$$
$$-1167.8\,\text{Hz} \leq \hat{f}_0 \leq 1167.8\,\text{Hz}$$

Accordingly, frequency offset estimation circuit 514 may calculate the product of the first accumulated correlation product and the second accumulated correlation product, isolate the phase of the product with an inverse tangent operation, and solve for $\hat{\epsilon}$ from the isolated phase. As can be seen from Equations (15) and (16), calculating the product of the first and second accumulated correlation products will cancel out the $n_0$ terms from the complex exponential and leave only a phase term dependent on $\epsilon$ and constants. Frequency offset estimation circuit 514 may thus calculate frequency offset estimate $\hat{\epsilon}$ from the first and second accumulated correlation products in 612. It is noted that the offset estimation circuitry 500 may be modified to calculate the first and second correlation products according to different raw channel sample positions, i.e. other than the $4^{th}$ and $7^{th}$ OFDM symbols separated by 6 subcarriers, which may depend on the interpolation used to obtain the overall set of raw channel samples (including both actual and interpolated). However, the alternate correlation products will need to be two-dimensional, i.e. across both time and frequency, and thus may need to utilize raw channel samples positioned at different time and frequency locations.

After obtaining $\hat{n}_0$ and $\hat{\epsilon}$ at 612, mobile terminal 102 may adjust radio communications in 614 based on $\hat{n}_0$ and $\hat{\epsilon}$ in order to synchronize reception (and/or transmission) with cell 104a. More specifically, offset estimation circuitry 500 may provide $\hat{n}_0$ and $\hat{\epsilon}$ to a control element of mobile terminal 102 (e.g. controller 410 or a physical layer controller of physical layer processing circuit 408) which may adjust one or both of the symbol boundary timing and carrier frequency tuning in order to synchronize radio communications with cell 104a. Mobile terminal 102 may perform method 600 periodically over time in order to continuously track both time and frequency synchronization with cell 104a and maintain a synchronous communication state.

As can be seen via comparison of Equations (10), (13), and (14) to Equations (18), (20), and (21), the offset estimation range of $\hat{n}_0$ and $\hat{\epsilon}$ is halved in the joint offset estimation procedure of method 600 compared to the conventional separate offset estimation procedure. However, simulations for the joint offset estimation procedure of method 600 show that variance is substantially less than in the conventional separate offset estimation procedure. Accordingly, mobile terminal 102 may be able to obtain highly accurate (low variance) time and frequency offset estimates $\hat{n}_0$ and $\flat$, which may as a result enable mobile terminal 102 to more accurately track time and frequency synchronization with cell 104a and reduce any signal corruption arising from synchronization mismatch. The joint offset estimation procedure of this disclosure may thus be highly advantageous, in particular for radio communication technologies that require high degrees of synchronization.

FIGS. 8-12 show mean and mean square error (MSE) simulation results for various different channel models including Additive White Gaussian Noise (AWGN), flat fading, Extended Pedestrian A (EPA), Extended Vehicular A (EVA), and Extended Typical Urban (ETU) channel propagation models, respectively. The simulations respectively corresponding to FIGS. 8-12 utilize the following simulation parameters:

TM1
BW=10 MHz
FFT size N=1024
Number of Transmit antenna p=1
Number of receive antenna q=1
Number of resource blocks 50 RB
Sampling rate 15.36 MHz
100 sub frame accumulation
Applied time offset $n_0$=−70 Ts
Applied normalized frequency offset ε=500/15000
Ideal propagation channel knowledge is assumed at receiver end
Fading profiles used for simulation
  a. Awgn
    Center of Gravity power delay profile=0 Ts
  b. Flat
    tapDelayNs=[0];
    tapPowerDecibel=[0];
    Center of Gravity power delay profile=0 Ts
  c. EPA
    tapDelayNs=[0 30 70 90 110 190 410];
    tapPowerDecibel=[0 −1 −2 −3 −8 −17.2 −20.8];
    Center of Gravity power delay profile=1 Ts
  d. EVA
    tapDelayNs=[0 30 150 310 370 710 1090 1730 2512];
    tapPowerDecibel=[0 −1.5 −1.4 −3.6 −6 −9.1 −7 −12 −16.9];
    Center of Gravity power delay profile=7.76 Ts
  e. ETU
    tapDelayNs=[0 50 120 200 230 500 1600 2300 5000];
    tapPowerDecibel=[−1 −1 −1 0 0 0 −3 −5 −7];
    Center of Gravity power delay profile=17.6 Ts As can be seen from the simulation results (plotted in dB) for each of FIGS. 8-12, the joint time and frequency offset estimation procedure of this disclosure consistently outperforms the conventional separate (or 1D) offset estimation procedure. As the estimation range of $\flat$ and $\hat{n}_0$ is reduced by half in the joint offset estimation procedure, the joint offset estimation procedure would decrease the mean square estimates by 6 dB. Accordingly, the joint offset estimation procedure detailed above may provide very low mean square error and thus be highly advantageous in particular for radio technologies requiring a high degree of synchronization (thus also demanding high accuracy in offset estimation).

Figure 13:
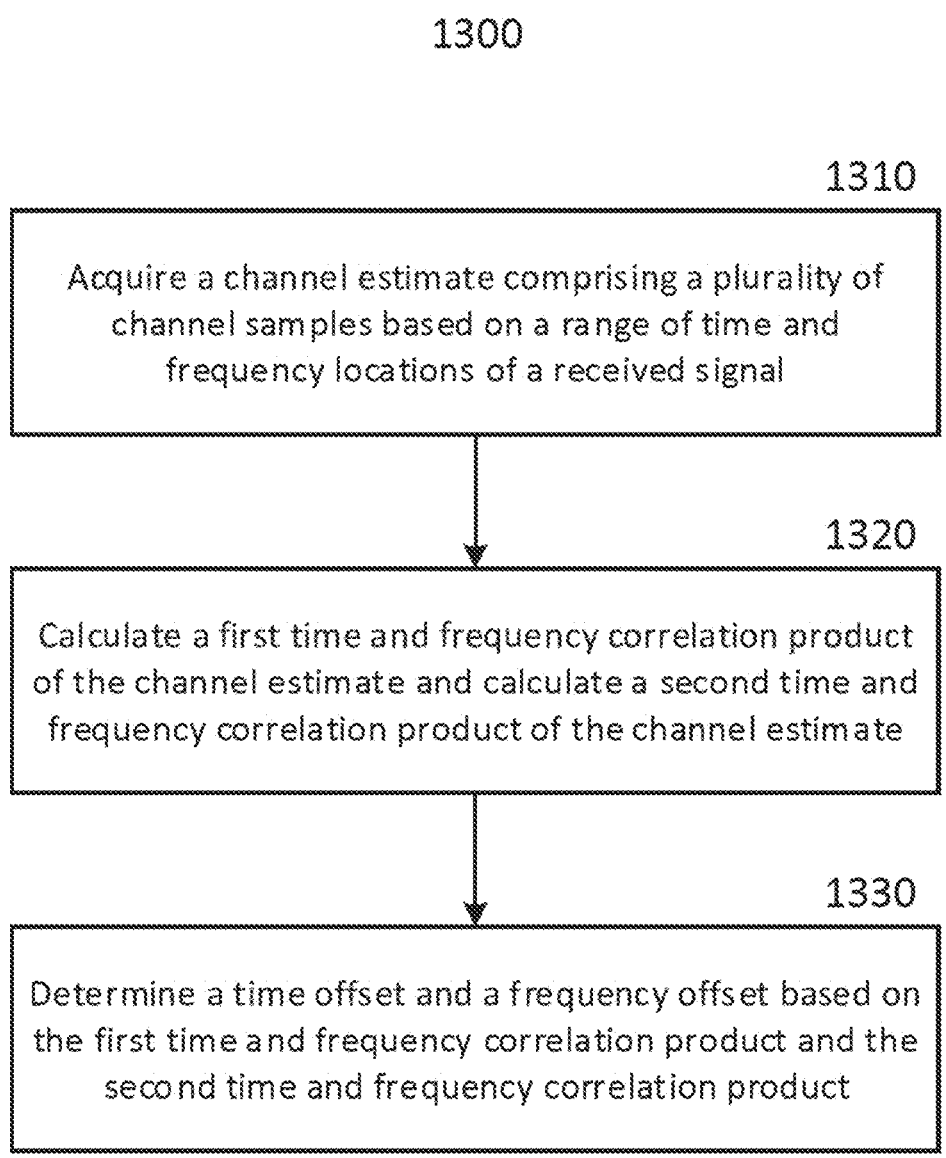
FIG. 13 shows a first method of performing offset estimation.

FIG. 13 shows method 1300 adapted for performing offset estimation used in mobile communication. As shown in FIG. 13, method 1300 includes acquiring a channel estimate composed of a plurality of channel samples based on a range of time and frequency locations of a received signal (1310), calculating a first time and frequency correlation product of the channel estimate and calculating a second time and frequency correlation product of the channel estimate (1320), and determining a time offset and a frequency offset based on the first time and frequency correlation product and the second time and frequency correlation product (1330).

Figure 14:
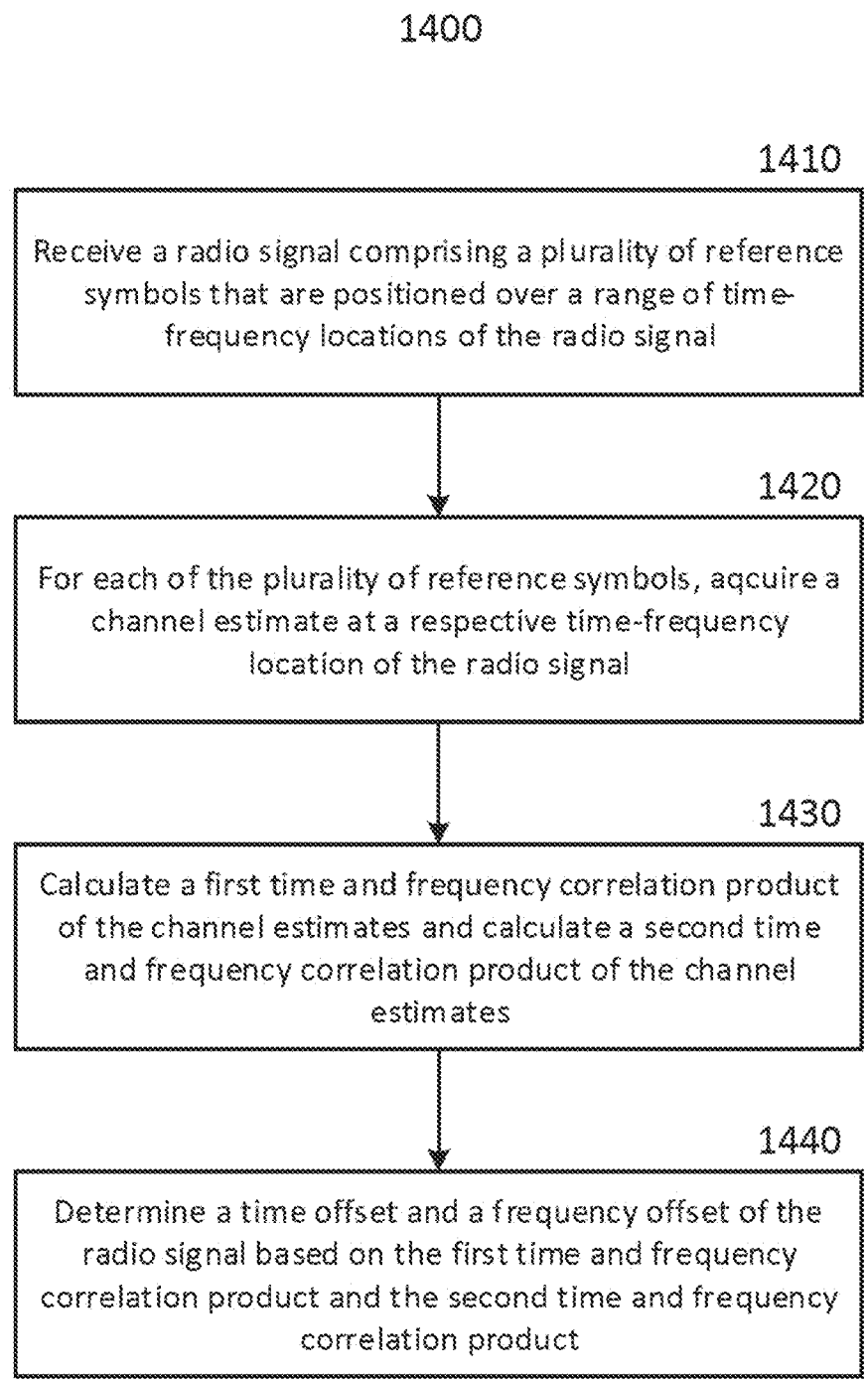
FIG. 14 shows a second method of performing offset estimation.

FIG. 14 shows method 1400 adapted for performing offset estimation used in mobile communication. As shown in FIG. 14, method 1400 includes receiving a radio signal including a plurality of reference symbols that are positioned over a range of time-frequency locations of the radio signal (1410), for each of the plurality of reference symbols, acquiring a channel estimate at a respective time-frequency location of the radio signal (1420), calculating a first time and frequency correlation product of the channel estimates and calculating a second time and frequency correlation product of the channel estimates (1430), and determining a time offset and a frequency offset of the radio signal based on the first time and frequency correlation product and the second time and frequency correlation product (1440).

In one or more further exemplary aspects of the disclosure, one or more of the features described above in reference to FIGS. 1-12 may be further incorporated into method 1300 and/or 1400. In particular, method 1300 and/or 1400 may be configured to perform further and/or alternate processes as detailed regarding mobile terminal 102 and/or offset estimation circuitry 500.

While the above descriptions may focus on an LTE context using CRS reference symbols to obtain the raw channel samples used for correlation product calculation, various other reference symbols (potentially of radio communication technologies other than LTE) may alternatively be used. Accordingly, the subcarrier and symbol separations between the raw channel samples used in the above equations may be modified by skilled persons to accommodate the joint time and frequency offset estimation procedure of this disclosure to other radio communication technology and reference signal contexts. Fundamentally all reference signal types with evenly-distributed reference symbols (e.g. according to a predefined pattern) may be utilized in place of the CRS symbols detailed above.

In particular, the joint offset estimation procedure of this disclosure may be analogously applied to Coordinated Multipoint (CoMP) LTE scenarios as defined by the 3GPP, where multiple transmit points (i.e. cells) may transmit to a single mobile terminal. In particular for CoMP schemes such as Dynamic Point Switching (DPS), in which the transmit point may switch every subframe, participating mobile terminals may need to maintain a very high level of synchronization with multiple transmit points in order to account for the varying distances between the mobile terminal and each transmit point. Accordingly, the reduced mean square may present the joint offset estimation procedure of this disclosure as an attractive offset estimation solution, where mobile terminal 102 may utilize either Channel State Information Reference Signals (CSI-RS) or downlink Demodulation Reference Signals (DMRS) in place of the CRS symbols used above in order to obtain time and frequency offset estimates for each of the transmit points.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/ commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a method adapted for performing offset estimation used in mobile communication, the method including acquiring a channel estimate comprising a plurality of channel samples based on a range of time and frequency locations of a received signal, calculating a first time and frequency correlation product of the channel estimate and calculating a second time and frequency correlation product of the channel estimate, and determining a time offset and a frequency offset based on the first time and frequency correlation product and the second time and frequency correlation product.

In Example 2, the subject matter of Example 1 can optionally further include receiving the received signal with an initial symbol timing and an initial carrier frequency, wherein the time offset is an offset of the initial symbol timing and the frequency offset is an offset of the initial carrier frequency.

In Example 3, the subject matter of Example 2 can optionally further include adjusting the initial symbol timing according to the time offset or adjusting the initial carrier frequency according to the frequency offset.

In Example 4, the subject matter of Example 1 or 2 can optionally further include adjusting reception of further signals according to the time offset and the frequency offset.

In Example 5, the subject matter of Example 1 or 2 can optionally further include synchronizing reception with a transmitter of the received signal according to the time offset or the frequency offset.

In Example 6, the subject matter of any one of Examples 1 to 5 can optionally include wherein the received signal includes a plurality of reference symbols, and wherein acquiring the channel estimate includes demodulating the plurality of reference symbols with one or more local reference symbols to obtain a plurality of original channel samples of the plurality of channel samples.

In Example 7, the subject matter of Example 6 can optionally include wherein the plurality of channel samples includes the plurality of original channel samples and a plurality of interpolated channel samples, and wherein acquiring the channel estimate further includes interpolating between the plurality of original channel samples to obtain the plurality of interpolated channel samples.

In Example 8, the subject matter of Example 6 or 7 can optionally include wherein the plurality of reference symbols are positioned in the received signal according to a predefined reference symbol pattern.

In Example 9, the subject matter of Example 8 can optionally include wherein the plurality of reference symbols are each located at a predefined subcarrier and a predefined symbol period of the received signal according to the predefined reference symbol pattern.

In Example 10, the subject matter of Example 8 or 9 can optionally include wherein each of the plurality of original channel samples are positioned at a time-frequency location of the received signal corresponding to a respective reference symbol of the plurality of reference symbols.

In Example 11, the subject matter of any one of Examples 8 to 10 can optionally include wherein the predefined reference symbol pattern is a two-dimensional reference symbol pattern over time and frequency.

In Example 12, the subject matter of any one of Examples 6 to 13 can optionally include wherein demodulating the plurality of reference symbols includes multiplying a respective one of the plurality of reference symbols with a complex conjugate of a respective one of the one or more local reference symbols to obtain each of the plurality of original channel samples.

In Example 13, the subject matter of any one of Examples 1 to 12 can optionally include wherein the plurality of reference symbols are cell-specific reference signal (CRS) symbols or downlink demodulation reference signal (DMRS) symbols.

In Example 14, the subject matter of any one of Examples 1 to 12 can optionally include wherein calculating the first time and frequency correlation product includes calculating first intermediate time and frequency correlation products between pairs of the plurality of channel samples that are located at a first time-frequency positioning relative to one another and summing the first intermediate time and frequency correlation products to obtain the first time and frequency correlation product, and wherein calculating the second time and frequency correlation product includes calculating second intermediate time and frequency correlation products between pairs of the plurality of channel samples that are located at a second time-frequency positioning relative to one another and summing the second intermediate time and frequency correlation products to obtain the first time and frequency correlation product.

In Example 15, the subject matter of Example 14 can optionally include wherein the channel samples of the pairs of the plurality of channel samples that are located at the first time-frequency positioning relative to one another are separated by a predefined first number of symbol periods in time and a predefined first number of subcarriers in frequency, and wherein the channel samples of the pairs of the plurality of channel samples that are located at the second time-frequency positioning relative to one another are separated by a predefined second number of symbol periods in time and a predefined second number of subcarriers in frequency.

In Example 16, the subject matter of any one of Examples 1 to 15 can optionally include wherein determining the time offset and the frequency offset from the first time and frequency correlation product and the second time and frequency correlation product includes calculating a first product with the first time and frequency correlation product and the second time and frequency correlation product, isolating a phase component of the first product, and solving the phase component of the first product for the time offset, and calculating a second product with the first time and frequency correlation product and the second time and frequency correlation product, isolating a phase component of the second product, and solving the phase component of the second product for the time offset.

In Example 17, the subject matter of Example 16 can optionally include wherein the first product is the product of second time and frequency correlation product and the complex conjugate of the first time and frequency correlation product and the second product is the product of the first time and frequency correlation product and the second time and frequency correlation product.

In Example 18, the subject matter of any one of Examples 1 to 17 can optionally include wherein calculating the first time and frequency correlation product includes calculating an first intermediate time and frequency correlation product for each of a plurality of antenna ports for each of a plurality of subframes and accumulating the first intermediate time and frequency correlation products to obtain the first time and frequency correlation product, and wherein calculating the second time and frequency correlation product includes calculating an second intermediate time and frequency correlation product for each of the plurality of antenna ports for each of the plurality of subframes and accumulating the second intermediate time and frequency correlation products to obtain the second time and frequency correlation product.

In Example 19, the subject matter of Example 18 can optionally include wherein the plurality of antenna ports includes one or more transmit antenna ports and one or more receive antenna ports.

In Example 20, the subject matter of any one of Examples 1 to 5 can optionally include wherein the received signal is a Long Term Evolution (LTE) signal.

In Example 21, the subject matter of any one of Examples 1 to 20 can optionally include performed at a radio communication device.

Example 22 is a radio communication device configured to perform the method of any one of Examples 1 to 21.

In Example 23, the subject matter of Example 22 can optionally include including a radio transceiver, antenna system, and baseband circuit.

Example 24 is a circuit arrangement configured to perform the method of any one of Examples 1 to 21.

Example 25 is a non-transitory computer readable medium storing instructions that direct a processor to perform the method of any one of Examples 1 to 21.

Example 26 is a method adapted for performing offset estimation used in mobile communication, the method including receiving a radio signal including a plurality of reference symbols that are positioned over a range of time-frequency locations of the radio signal, for each of the plurality of reference symbols, acquiring a channel estimate at a respective time-frequency location of the radio signal, calculating a first time and frequency correlation product of the channel estimates and calculating a second time and frequency correlation product of the channel estimates, and determining a time offset and a frequency offset of the radio signal based on the first time and frequency correlation product and the second time and frequency correlation product.

In Example 27, the subject matter of Example 26 can optionally include wherein receiving the radio signal includes receiving the radio signal with an initial symbol timing and an initial carrier frequency, wherein the time offset is an offset of the initial symbol timing and the frequency offset is an offset of the initial carrier frequency.

In Example 28, the subject matter of Example 26 can optionally further include adjusting the initial symbol timing according to the time offset or adjusting the initial carrier frequency according to the frequency offset.

In Example 29, the subject matter of Example 26 or 27 can optionally further include adjusting reception of further radio signals according to the time offset and the frequency offset.

In Example 30, the subject matter of Example 26 or 27 can optionally further include synchronizing reception with a transmitter of the radio signal according to the time offset or the frequency offset.

In Example 31, the subject matter of any one of Examples 26 to 30 can optionally include wherein acquiring the channel estimates includes demodulating the plurality of reference symbols with one or more local reference symbols to obtain each of a plurality of original channel estimates of the channel estimates.

In Example 32, the subject matter of Example 31 can optionally include wherein the channel estimates include the plurality of original channel estimates and a plurality of interpolated channel estimates, and wherein acquiring the channel estimates further includes interpolating between the plurality of original channel estimates to obtain the plurality of interpolated channel estimates.

In Example 33, the subject matter of Example 31 or 32 can optionally include wherein the respective time-frequency location of each channel estimate corresponds to a respective time-frequency of one of the plurality of reference symbols within the radio signal.

In Example 34, the subject matter of any one of Examples 31 to 33 can optionally include wherein demodulating the plurality of reference symbols includes multiplying a respective one of the plurality of reference symbols with a complex conjugate of a respective one of the one or more local reference symbols to obtain each of the plurality of original channel estimates.

In Example 35, the subject matter of any one of Examples 26 to 34 can optionally include wherein the plurality of reference symbols are positioned in the radio signal according to a predefined reference symbol pattern.

In Example 36, the subject matter of Example 35 can optionally include wherein the plurality of reference symbols are each located at a predefined subcarrier and a predefined symbol period of the radio signal according to the predefined reference symbol pattern.

In Example 37, the subject matter of Example 35 or 36 can optionally include wherein the predefined reference symbol pattern is a two-dimensional reference symbol pattern over time and frequency.

In Example 38, the subject matter of any one of Examples 26 to 37 can optionally include wherein the plurality of reference symbols are cell-specific reference signal (CRS) symbols or downlink demodulation reference signal (DMRS) symbols.

In Example 39, the subject matter of any one of Examples 26 to 38 can optionally include wherein calculating the first time and frequency correlation product includes calculating first intermediate time and frequency correlation products between pairs of the channel estimates that are located at a first time-frequency positioning relative to one another and summing the first intermediate time and frequency correlation products to obtain the first time and frequency correlation product, and wherein calculating the second time and frequency correlation product includes calculating second intermediate time and frequency correlation products between pairs of the channel estimates that are located at a second time-frequency positioning relative to one another and summing the second intermediate time and frequency correlation products to obtain the first time and frequency correlation product.

In Example 40, the subject matter of Example 39 can optionally include wherein the channel estimates of the pairs of channel estimates that are located at the first time-frequency positioning relative to one another are separated by a predefined first number of symbol periods in time and a predefined first number of subcarriers in frequency, and wherein the channel estimates of the pairs of plurality of channel samples that are located at the second time-frequency positioning relative to one another are separated by a predefined second number of symbol periods in time and a predefined second number of subcarriers in frequency.

In Example 41, the subject matter of any one of Examples 26 to 40 can optionally include wherein determining the time offset and the frequency offset based on the first time and frequency correlation product and the second time and frequency correlation product includes calculating a first product with the first time and frequency correlation product and the second time and frequency correlation product, isolating a phase component of the first product, and solving the phase component of the first product for the time offset, and calculating a second product with the first time and frequency correlation product and the second time and frequency correlation product, isolating a phase component of the second product, and solving the phase component of the second product for the time offset.

In Example 42, the subject matter of Example 41 can optionally include wherein the first product is the product of second time and frequency correlation product and the complex conjugate of the first time and frequency correlation product and the second product is the product of the first time and frequency correlation product and the second time and frequency correlation product.

In Example 43, the subject matter of any one of Examples 26 to 42 can optionally include wherein calculating the first time and frequency correlation product includes calculating an first intermediate time and frequency correlation product for each of a plurality of antenna ports for each of a plurality of subframes and accumulating the first intermediate time and frequency correlation products to obtain the first time and frequency correlation product, and wherein calculating the second time and frequency correlation product includes calculating an second intermediate time and frequency correlation product for each of the plurality of antenna ports for each of the plurality of subframes and accumulating the second intermediate time and frequency correlation products to obtain the second time and frequency correlation product.

In Example 44, the subject matter of Example 43 can optionally include wherein the plurality of antenna ports includes one or more transmit antenna ports and one or more receive antenna ports.

In Example 45, the subject matter of any one of Examples 26 to 30 can optionally include wherein the received signal is a Long Term Evolution (LTE) signal.

In Example 46, the subject matter of any one of Examples 26 to 45 can optionally include performed at a radio communication device.

Example 47 is a radio communication device configured to perform the method of any one of Examples 26 to 45.

In Example 48, the subject matter of Example 47 can optionally include including a radio transceiver, antenna system, and baseband circuit.

Example 49 is a circuit arrangement configured to perform the method of any one of Examples 26 to 45.

Example 50 is a non-transitory computer readable medium storing instructions that direct a processor to perform the method of any one of Examples 26 to 45.

Example 51 is a circuit arrangement including a channel estimation circuit configured to acquire a channel estimate comprising a plurality of channel samples based on a range of time and frequency locations of a received signal, a first calculation circuit configured to calculate a first time and frequency correlation product of the channel estimate and a second calculation circuit configured to calculate a second time and frequency correlation product of the channel estimate, a time offset circuit configured to determine a time offset based on the first time and frequency correlation product and the second time and frequency correlation product, and a frequency offset circuit configured to determine a frequency offset based on the first time and frequency correlation product and the second time and frequency correlation product.

In Example 52, the subject matter of Example 51 can optionally further include a radio transceiver, an antenna system, and a controller and configured as a radio communication device.

In Example 53, the subject matter of Example 52 can optionally include wherein the radio transceiver is configured to receive the received signal with an initial symbol timing and an initial carrier frequency, wherein the time offset is an offset of the initial symbol timing and the frequency offset is an offset of the initial carrier frequency.

In Example 54, the subject matter of Example 53 can optionally include wherein the radio transceiver is further configured to adjust the initial symbol timing according to the time offset or adjust the initial carrier frequency according to the frequency offset.

In Example 55, the subject matter of Example 52 or 53 can optionally include wherein the radio transceiver is further configured to adjust reception of further signals according to the time offset and the frequency offset.

In Example 56, the subject matter of Example 52 or 53 can optionally include wherein the radio transceiver is further configured to synchronize reception with a transmitter of the received signal according to the time offset or the frequency offset.

In Example 57, the subject matter of any one of Examples 51 to 56 can optionally include wherein the received signal includes a plurality of reference symbols and wherein the channel estimation circuit is configured to acquire the channel estimate by demodulating the plurality of reference symbols with one or more local reference symbols to obtain a plurality of original channel samples of the plurality of channel samples.

In Example 58, the subject matter of Example 57 can optionally include wherein the plurality of channel samples includes the plurality of original channel samples and a plurality of interpolated channel samples, and wherein the channel estimation circuit is further configured to acquire the channel estimate further by interpolating between the plurality of original channel samples to obtain the plurality of interpolated channel samples.

In Example 59, the subject matter of Example 57 or 58 can optionally include wherein the plurality of reference symbols are positioned in the received signal according to a predefined reference symbol pattern.

In Example 60, the subject matter of Example 59 can optionally include wherein the plurality of reference symbols are each located at a predefined subcarrier and a predefined symbol period of the received signal according to the predefined reference symbol pattern.

In Example 61, the subject matter of Example 59 or 60 can optionally include wherein each of the plurality of original channel samples are positioned at a time-frequency location of the received signal corresponding to a respective reference symbol of the plurality of reference symbols.

In Example 62, the subject matter of any one of Examples 59 to 61 can optionally include wherein the predefined reference symbol pattern is a two-dimensional reference symbol pattern over time and frequency.

In Example 63, the subject matter of any one of Examples 57 to 64 can optionally include wherein the channel estimation circuit is configured to demodulate the plurality of reference symbols by multiplying a respective one of the plurality of reference symbols with a complex conjugate of a respective one of the one or more local reference symbols to obtain each of the plurality of original channel samples.

In Example 64, the subject matter of any one of Examples 51 to 63 can optionally include wherein the plurality of reference symbols are cell-specific reference signal (CRS) symbols or downlink demodulation reference signal (DMRS) symbols.

In Example 65, the subject matter of any one of Examples 51 to 64 can optionally include wherein the first calculation circuit is configured to calculate the first time and frequency correlation product by calculating first intermediate time and frequency correlation products between pairs of the plurality of channel samples that are located at a first time-frequency positioning relative to one another and summing the first intermediate time and frequency correlation products to obtain the first time and frequency correlation product, and wherein the second calculation circuit is configured to calculate the second time and frequency correlation product by calculating second intermediate time and frequency correlation products between pairs of the plurality of channel samples that are located at a second time-frequency positioning relative to one another and summing the second intermediate time and frequency correlation products to obtain the first time and frequency correlation product.

In Example 66, the subject matter of Example 65 can optionally include wherein the channel samples of the pairs of the plurality of channel samples that are located at the first time-frequency positioning relative to one another are separated by a predefined first number of symbol periods in time and a predefined first number of subcarriers in frequency, and wherein the channel samples of the pairs of the plurality of channel samples that are located at the second time-frequency positioning relative to one another are separated by a predefined second number of symbol periods in time and a predefined second number of subcarriers in frequency.

In Example 67, the subject matter of any one of Examples 51 to 66 can optionally include wherein the time offset circuit is configured to determine the time offset based on the first time and frequency correlation product and the second time and frequency correlation product by calculating a first product with the first time and frequency correlation product and the second time and frequency correlation product, isolating a phase component of the first product, and solving the phase component of the first product for the time offset, and wherein the frequency offset circuit is configured to determine the frequency offset based on the first time and frequency correlation product and the second time and frequency correlation product by calculating a second product with the first time and frequency correlation product and the second time and frequency correlation product, isolating a phase component of the second product, and solving the phase component of the second product for the time offset.

In Example 68, the subject matter of Example 67 can optionally include wherein the first product is the product of second time and frequency correlation product and the complex conjugate of the first time and frequency correlation product and the second product is the product of the first time and frequency correlation product and the second time and frequency correlation product.

In Example 69, the subject matter of any one of Examples 51 to 68 can optionally include wherein the first calculation circuit is configured to calculate the first time and frequency correlation product by calculating an first intermediate time and frequency correlation product for each of a plurality of antenna ports for each of a plurality of subframes and accumulating the first intermediate time and frequency correlation products to obtain the first time and frequency correlation product, and wherein the second calculation circuit is configured to calculate the second time and frequency correlation product by calculating the second time and frequency correlation product includes calculating an second intermediate time and frequency correlation product for each of the plurality of antenna ports for each of the plurality of subframes and accumulating the second intermediate time and frequency correlation products to obtain the second time and frequency correlation product.

In Example 70, the subject matter of Example 69 can optionally include wherein the plurality of antenna ports includes one or more transmit antenna ports and one or more receive antenna ports.

In Example 71, the subject matter of any one of Examples 51 to 70 can optionally include wherein the received signal is a Long Term Evolution (LTE) signal.

Example 72 is a circuit arrangement including a radio transceiver configured to receive a radio signal including a plurality of reference symbols that are positioned over a range of time-frequency locations of the radio signal, a channel estimation circuit configured to, for each of the plurality of reference symbols, acquire a channel estimate at a respective time-frequency location of the radio signal, a first calculation circuit configured to calculate a first time and frequency correlation product of the channel estimates and a second calculation circuit configured to calculate a second time and frequency correlation product of the channel estimates, a time offset circuit configured to determine a time offset based on the first time and frequency correlation product and the second time and frequency correlation product, and a frequency offset circuit configured to determine a frequency offset based on the first time and frequency correlation product and the second time and frequency correlation product.

In Example 73, the subject matter of Example 72 can optionally further include an antenna system and controller and configured as a radio communication device.

In Example 74, the subject matter of Example 72 can optionally include wherein the radio transceiver is configured to receive the radio signal by receiving the radio signal with an initial symbol timing and an initial carrier frequency, wherein the time offset is an offset of the initial symbol timing and the frequency offset is an offset of the initial carrier frequency.

In Example 75, the subject matter of Example 74 can optionally include wherein the radio transceiver is further configured to adjust the initial symbol timing according to the time offset or to adjust the initial carrier frequency according to the frequency offset.

In Example 76, the subject matter of any one of Examples 72 to 74 can optionally include wherein the radio transceiver is further configured to adjust reception of further radio signals according to the time offset and the frequency offset.

In Example 77, the subject matter of any one of Examples 72 to 74 can optionally include wherein the radio transceiver is further configured to synchronize reception with a transmitter of the radio signal according to the time offset or the frequency offset.

In Example 78, the subject matter of any one of Examples 72 to 77 can optionally include wherein the channel estimation circuit is configured to acquire the channel estimates by demodulating the plurality of reference symbols with one or more local reference symbols to obtain each of a plurality of original channel estimates of the channel estimates.

In Example 79, the subject matter of Example 78 can optionally include wherein the channel estimates include the plurality of original channel estimates and a plurality of interpolated channel estimates, and wherein the channel estimation is further configured to acquire the channel estimates by interpolating between the plurality of original channel estimates to obtain the plurality of interpolated channel estimates.

In Example 80, the subject matter of Example 78 or 79 can optionally include wherein the respective time-frequency location of each channel estimate corresponds to a respective time-frequency of one of the plurality of reference symbols within the radio signal.

In Example 81, the subject matter of any one of Examples 78 to 80 can optionally include wherein the channel estimation circuit is configured to demodulate the plurality of reference symbols by multiplying a respective one of the plurality of reference symbols with a complex conjugate of a respective one of the one or more local reference symbols to obtain each of the plurality of original channel estimates.

In Example 82, the subject matter of any one of Examples 72 to 81 can optionally include wherein the plurality of reference symbols are positioned in the radio signal according to a predefined reference symbol pattern.

In Example 83, the subject matter of Example 82 can optionally include wherein the plurality of reference symbols are each located at a predefined subcarrier and a predefined symbol period of the radio signal according to the predefined reference symbol pattern.

In Example 84, the subject matter of Example 82 or 83 can optionally include wherein the predefined reference symbol pattern is a two-dimensional reference symbol pattern over time and frequency.

In Example 85, the subject matter of any one of Examples 72 to 84 can optionally include wherein the plurality of reference symbols are cell-specific reference signal (CRS) symbols or downlink demodulation reference signal (DMRS) symbols.

In Example 86, the subject matter of any one of Examples 72 to 85 can optionally include wherein the first calculation circuit is configured to calculate the first time and frequency correlation product by calculating first intermediate time and frequency correlation products between pairs of the channel estimates that are located at a first time-frequency positioning relative to one another and summing the first intermediate time and frequency correlation products to obtain the first time and frequency correlation product, and wherein the second calculation circuit is configured to calculate the second time and frequency correlation product by calculating second intermediate time and frequency correlation products between pairs of the channel estimates that are located at a second time-frequency positioning relative to one another and summing the second intermediate time and frequency correlation products to obtain the first time and frequency correlation product.

In Example 87, the subject matter of Example 86 can optionally include wherein the channel estimates of the pairs of channel estimates that are located at the first time-frequency positioning relative to one another are separated by a predefined first number of symbol periods in time and a predefined first number of subcarriers in frequency, and wherein the channel estimates of the pairs of plurality of channel samples that are located at the second time-frequency positioning relative to one another are separated by a predefined second number of symbol periods in time and a predefined second number of subcarriers in frequency.

In Example 88, the subject matter of any one of Examples 72 to 87 can optionally include wherein the time offset circuit is configured to determine the time offset by calculating a first product with the first time and frequency correlation product and the second time and frequency correlation product, isolating a phase component of the first product, and solving the phase component of the first product for the time offset, and wherein the frequency offset circuit is configured to determine the frequency offset by calculating a second product with the first time and frequency correlation product and the second time and frequency correlation product, isolating a phase component of the second product, and solving the phase component of the second product for the time offset.

In Example 89, the subject matter of Example 88 can optionally include wherein the first product is the product of second time and frequency correlation product and the complex conjugate of the first time and frequency correlation product and the second product is the product of the first time and frequency correlation product and the second time and frequency correlation product.

In Example 90, the subject matter of any one of Examples 72 to 87 can optionally include wherein the first calculation circuit is configured to calculate the first time and frequency correlation product by calculating an first intermediate time and frequency correlation product for each of a plurality of antenna ports for each of a plurality of subframes and accumulating the first intermediate time and frequency correlation products to obtain the first time and frequency correlation product, and wherein the second time and frequency correlation product circuit is configured to calculate the second time and frequency correlation product by calculating an second intermediate time and frequency correlation product for each of the plurality of antenna ports for each of the plurality of subframes and accumulating the second intermediate time and frequency correlation products to obtain the second time and frequency correlation product.

In Example 91, the subject matter of Example 90 can optionally include wherein the plurality of antenna ports includes one or more transmit antenna ports and one or more receive antenna ports.

In Example 92, the subject matter of any one of Examples 72 to 91 can optionally include wherein the received signal is a Long Term Evolution (LTE) signal.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement comprising:
a channel estimation circuit configured to acquire a channel estimate comprising a plurality of channel samples based on a range of time and frequency locations of a received signal;
a first calculation circuit configured to calculate a first time and frequency correlation product of the channel estimate and a second calculation circuit configured to calculate a second time and frequency correlation product of the channel estimate;
a time offset circuit configured to determine a time offset based on the first time and frequency correlation product and the second time and frequency correlation product by calculating a first product with the first time and frequency correlation product and the second time and frequency correlation product, isolating a phase component of the first product, and solving the phase component of the first product for the time offset; and
a frequency offset circuit configured to determine a frequency offset based on the first time and frequency correlation product and the second time and frequency correlation product by calculating a second product with the first time and frequency correlation product and the second time and frequency correlation product, isolating a phase component of the second product, and solving the phase component of the second product for the time offset.

2. The circuit arrangement of claim 1, further comprising a radio transceiver, an antenna system, and a controller and configured as a radio communication device.

3. The circuit arrangement of claim 2, wherein the radio transceiver is further configured to synchronize reception with a transmitter of the received signal according to the time offset or the frequency offset.

4. The circuit arrangement of claim 1, wherein the received signal comprises a plurality of reference symbols and wherein the channel estimation circuit is configured to acquire the channel estimate by:
demodulating the plurality of reference symbols with one or more local reference symbols to obtain a plurality of original channel samples of the plurality of channel samples.

5. The circuit arrangement of claim 4, wherein the plurality of channel samples comprises the plurality of original channel samples and a plurality of interpolated channel samples, and wherein the channel estimation circuit is further configured to acquire the channel estimate further by:
interpolating between the plurality of original channel samples to obtain the plurality of interpolated channel samples.

6. The circuit arrangement of claim 4, wherein the plurality of reference symbols are positioned in the received signal according to a predefined reference symbol pattern.

7. The circuit arrangement of claim 1, wherein the plurality of reference symbols are cell-specific reference signal (CRS) symbols or downlink demodulation reference signal (DMRS) symbols.

8. The circuit arrangement of claim 1, wherein the first calculation circuit is configured to calculate the first time and frequency correlation product by calculating first intermediate time and frequency correlation products between pairs of the plurality of channel samples that are located at a first time-frequency positioning relative to one another and summing the first intermediate time and frequency correlation products to obtain the first time and frequency correlation product,
and wherein the second calculation circuit is configured to calculate the second time and frequency correlation product by calculating second intermediate time and frequency correlation products between pairs of the plurality of channel samples that are located at a second time-frequency positioning relative to one another and summing the second intermediate time and frequency correlation products to obtain the first time and frequency correlation product.

9. The circuit arrangement of claim 8, wherein the channel samples of the pairs of the plurality of channel samples that are located at the first time-frequency positioning relative to one another are separated by a predefined first number of symbol periods in time and a predefined first number of subcarriers in frequency,
and wherein the channel samples of the pairs of the plurality of channel samples that are located at the second time-frequency positioning relative to one another are separated by a predefined second number of symbol periods in time and a predefined second number of subcarriers in frequency.

10. The circuit arrangement of claim 1, wherein the first product is the product of second time and frequency correlation product and the complex conjugate of the first time and frequency correlation product and the second product is the product of the first time and frequency correlation product and the second time and frequency correlation product.

11. The circuit arrangement of claim 1, wherein the first calculation circuit is configured to calculate the first time and frequency correlation product by calculating an first intermediate time and frequency correlation product for each of a plurality of antenna ports for each of a plurality of subframes and accumulating the first intermediate time and frequency correlation products to obtain the first time and frequency correlation product,
and wherein the second calculation circuit is configured to calculate the second time and frequency correlation product by calculating an second intermediate time and frequency correlation product for each of the plurality of antenna ports for each of the plurality of subframes and accumulating the second intermediate time and frequency correlation products to obtain the second time and frequency correlation product.

12. The circuit arrangement of claim 1, wherein the received signal is a Long Term Evolution (LTE) signal.

13. A circuit arrangement comprising:
a radio transceiver configured to receive a radio signal comprising a plurality of reference symbols that are positioned over a range of time-frequency locations of the radio signal;
a channel estimation circuit configured to, for each of the plurality of reference symbols, acquire a channel estimate at a respective time-frequency location of the radio signal;
a first calculation circuit configured to calculate a first time and frequency correlation product of the channel estimates and a second calculation circuit configured to calculate a second time and frequency correlation product of the channel estimates;
a time offset circuit configured to determine a time offset based on the first time and frequency correlation product and the second time and frequency correlation product by calculating a first product with the first time and frequency correlation product and the second time and frequency correlation product, isolating a phase component of the first product, and solving the phase component of the first product for the time offset; and a frequency offset circuit configured to determine a frequency offset based on the first time and frequency correlation product and the second time and frequency correlation product by calculating a second product with the first time and frequency correlation product and the second time and frequency correlation product, isolating a phase component of the second product, and solving the phase component of the second product for the time offset.

14. The circuit arrangement of claim 13, further comprising an antenna system and controller and configured as a radio communication device.

15. The circuit arrangement of claim 13, wherein the radio transceiver is further configured to synchronize reception with a transmitter of the radio signal according to the time offset or the frequency offset.

16. The circuit arrangement of claim 13, wherein the first calculation circuit is configured to calculate the first time and frequency correlation product by calculating first intermediate time and frequency correlation products between pairs of the channel estimates that are located at a first time-frequency positioning relative to one another and summing the first intermediate time and frequency correlation products to obtain the first time and frequency correlation product, and wherein the second calculation circuit is configured to calculate the second time and frequency correlation product by calculating second intermediate time and frequency correlation products between pairs of the channel estimates that are located at a second time-frequency positioning relative to one another and summing the second intermediate time and frequency correlation products to obtain the second time and frequency correlation product.

17. A method adapted for performing offset estimation used in mobile communication, the method comprising:

acquiring a channel estimate comprising a plurality of channel samples based on a range of time and frequency locations of a received signal;

calculating a first time and frequency correlation product of the channel estimate;

calculating a second time and frequency correlation product of the channel estimate; and determining a time offset based on the first time and frequency correlation product and the second time and frequency correlation product by calculating a first product with the first time and frequency correlation product and the second time and frequency correlation product, isolating a phase component of the first product, and solving the phase component of the first product for the time offset; and determining a frequency offset based on the first time and frequency correlation product and the second time and frequency correlation product by calculating a second product with the first time and frequency correlation product and the second time and frequency correlation product, isolating a phase component of the second product, and solving the phase component of the second product for the time offset.

18. The method of claim 17, further comprising synchronizing reception with a transmitter of the received signal according to the time offset or the frequency offset.

19. The method of claim 17, wherein calculating the first time and frequency correlation product comprises calculating first intermediate time and frequency correlation products between pairs of the plurality of channel samples that are located at a first time-frequency positioning relative to one another and summing the first intermediate time and frequency correlation products to obtain the first time and frequency correlation product;

and wherein calculating the second time and frequency correlation product comprises calculating second intermediate time and frequency correlation products between pairs of the plurality of channel samples that are located at a second time-frequency positioning relative to one another and summing the second intermediate time and frequency correlation products to obtain the first time and frequency correlation product.

* * * * *